US 9,122,952 B2

(12) United States Patent
Silver et al.

(10) Patent No.: US 9,122,952 B2
(45) Date of Patent: Sep. 1, 2015

(54) METHODS AND APPARATUS FOR ONE-DIMENSIONAL SIGNAL EXTRACTION

(75) Inventors: William M. Silver, Nobleboro, ME (US); Ivan Bachelder, Hillborough, NC (US)

(73) Assignee: COGNEX CORPORATION, Natick, MA (US)

( * ) Notice: Subject to any disclaimer, the term of this patent is extended or adjusted under 35 U.S.C. 154(b) by 189 days.

(21) Appl. No.: 13/336,275

(22) Filed: Dec. 23, 2011

(65) Prior Publication Data

US 2013/0163876 A1  Jun. 27, 2013

(51) Int. Cl.
*G06K 9/62* (2006.01)
*G06K 9/00* (2006.01)
*G06K 9/40* (2006.01)
*G06K 9/46* (2006.01)
*G06K 7/00* (2006.01)
*G06K 7/14* (2006.01)

(52) U.S. Cl.
CPC .. *G06K 9/46* (2013.01); *G06K 7/00* (2013.01); *G06K 7/1413* (2013.01); *G06K 7/1478* (2013.01)

(58) Field of Classification Search
None
See application file for complete search history.

(56) References Cited

U.S. PATENT DOCUMENTS

| | | | |
|---|---|---|---|
| 5,155,343 A | 10/1992 | Chandler | |
| 5,296,690 A * | 3/1994 | Chandler et al. | 235/462.1 |
| 5,428,211 A | 6/1995 | Zheng et al. | |
| 5,446,271 A | 8/1995 | Cherry et al. | |
| 5,581,632 A | 12/1996 | Koljonen et al. | |
| 5,676,302 A | 10/1997 | Petry | |
| 5,717,785 A | 2/1998 | Silver | |
| 5,742,263 A | 4/1998 | Wang et al. | |
| 5,835,622 A | 11/1998 | Koljonen et al. | |
| 5,872,870 A | 2/1999 | Michael | |
| 5,901,241 A | 5/1999 | Koljonen | |
| 6,002,793 A | 12/1999 | Silver et al. | |
| 6,061,467 A | 5/2000 | Michael | |
| 6,067,379 A | 5/2000 | Silver | |
| 6,075,881 A | 6/2000 | Foster et al. | |
| 6,142,376 A | 11/2000 | Cherry et al. | |
| 6,175,644 B1 | 1/2001 | Scola et al. | |

(Continued)

FOREIGN PATENT DOCUMENTS

| | | | |
|---|---|---|---|
| DE | 10007985 | 9/2000 | |
| WO | 2011077182 A1 | 6/2011 | |
| WO | WO 2011/077182 * | 6/2011 | G06K 7/14 |

OTHER PUBLICATIONS

Gallo et al, "Reading 1D Barcodes with Mobile Phones Using Deformable Templates," IEEE Transactions on Pattern Analysis and Machine Intelligence, vol. 33, No. 9, pp. 1834-1843.*

(Continued)

*Primary Examiner* — Bhavesh Mehta
*Assistant Examiner* — David F Dunphy

(57) ABSTRACT

Methods and apparatus are disclosed for extracting a one-dimensional digital signal from a two-dimensional digital image along a projection line. In some embodiments a repeating sequence of pixel weight templates, and a sequence of relative positions, are selected in response to the orientation of a projection line and used to compute a sequence of weighted sums. The sequence can be selected to achieve desirable properties, for example photometric accuracy, geometric accuracy, resolution, and/or noise reduction. In some embodiments registers and multiply-accumulators are arranged and controlled so as to compute the 1D signal.

14 Claims, 18 Drawing Sheets

(56) References Cited

U.S. PATENT DOCUMENTS

| | | | |
|---|---|---|---|
| 6,240,218 | B1 | 5/2001 | Michael et al. |
| 6,249,602 | B1 | 6/2001 | Michael et al. |
| 6,381,375 | B1 | 4/2002 | Reyzin |
| 6,396,517 | B1 | 5/2002 | Beck et al. |
| 6,565,003 | B1 | 5/2003 | Ma |
| 6,674,919 | B1 | 1/2004 | Ma et al. |
| 6,801,649 | B1 | 10/2004 | Michael et al. |
| 7,181,064 | B1 | 2/2007 | Stevens et al. |
| 7,254,275 | B2 | 8/2007 | Tabesh et al. |
| 7,273,177 | B2 | 9/2007 | Wang et al. |
| 7,293,714 | B2 | 11/2007 | Zhu et al. |
| 7,347,373 | B2 | 3/2008 | Singh |
| 7,487,916 | B2 | 2/2009 | Cai |
| 7,573,616 | B2 | 8/2009 | Poor |
| 7,721,966 | B2 | 5/2010 | Rudeen et al. |
| 7,743,994 | B2 | 6/2010 | Actis |
| 8,121,440 | B2 | 2/2012 | Barber et al. |
| 8,170,339 | B2 | 5/2012 | Takemoto |
| 2002/0162889 | A1 | 11/2002 | Navon |
| 2005/0275831 | A1 | 12/2005 | Silver |
| 2006/0202040 | A1 | 9/2006 | Wang et al. |
| 2006/0278708 | A1 | 12/2006 | Olmstead |
| 2006/0283953 | A1 | 12/2006 | He |
| 2007/0057066 | A1 | 3/2007 | Cai et al. |
| 2007/0228176 | A1 | 10/2007 | Vinogradov |
| 2008/0169347 | A1 | 7/2008 | Olmstead |
| 2009/0128627 | A1 | 5/2009 | Katsuyama et al. |
| 2010/0141829 | A1 | 6/2010 | Jalali et al. |
| 2011/0004870 | A1 | 1/2011 | Pettinelli et al. |
| 2011/0073657 | A1 | 3/2011 | Trajkovic et al. |

OTHER PUBLICATIONS

Bailey, "Super Resolution of Bar Codes", Journal of Electronic Imaging 10(1), (Jan. 2001), 213-220.
Bracewell, et al., "Two Dimensional Imaging", Prentice-Hall Inc., Englewood Cliffs, New Jersey, pp. 74-78 and 287-290 and 498-504 and 514-517 and 526-537, (1995).
Cain, et al., "Projection based Image Registration in the presence of a fixed-pattern noise", IEEE Transactions on Image Processing, vol. 10, No. 12, (Dec. 2001).
Cognex Corporation, "3000/4000/5000 Image Processing", Chapter 7, Projection Tools (1996).
Dhawan, "Medical Image Analysis", Medical Imaging Modalities, IEEE Press, (2003).
Fuh, et al., "Projection for Pattern Recognition", Image and Vision Computing 16, (1998).
Guedon, et al., "The Mojette Transform: The First Ten Years", hal-00267621 Version 1, (Mar. 27, 2008).
Haralick, et al., "Computer and Robot Vision", Binary Machine Vision, Addision-Wesley Publishing Company, Inc., (1992), pp. 48-55 and 589 and 596.
Hsung, et al., "The Discrete Periodic Radon Transform", IEEE Transactions on Signal Processing, vol. 44, No. 10, (Oct. 1996).
Jahne, "Practical Handbook on Image Processing for Scientific Applications", pp. 302-306 and 358-359, CRC Press, (1997).
Jain, et al., "Machine Vision", Chapter 2, section 3, Projections, McGraw-Hill Series in Computer Science, (May 1, 1995).
Kelley, et al., "The Fast Discrete Radon Transform—I: Theory", IEEE Transactions on Image Processing, vol. 2, No. 3, (Jul. 1993).
Kim, et al., "A Fast feature-based block Matching Algorithm", IEEE Journal on Selected areas in communications, vol. 10, No. 5, (Jun. 1992).
Kingston, et al., "Projective Transforms on Periodic Discrete Image Arrays", Advances in Imaging and Electron Physics, vol. 139, Elsevier, (2006).
Lee, et al., "Real-Time Illegal Parking Detection in Outdoor Environments Using 1D transforms", IEEE Transaction on Circuits and Systems for video technology, vol. 19, No. 7, (Jul. 2009).
Mathworks Inc., "Fan-Beam Projection Data", Image Processing Toolbox, (1984-2011).
Mathworks Inc., "Radon Transform", Image Processing Toolbox, (1984-2011).
Matus, et al., "Image Representations via a Finite Radon Transform", IEEE Transactions on Pattern Analysis and Machine Intelligence, vol. 15, No. 10, (Oct. 1993).
Normand, et al., "A Two-Dimensional Bar Code Reader", IEEE, (1994).
Offen, "VLSI Image Processing", Collins Professional and Technical Books, London, (1985).
Palmer, "The Bar Code Book", A comprehensive guide to reading, printing, specifying, evaluating, and using bar code and other machine-readable symbols, Fifth edition, excerpt, (2007), pp. 124-125.
Sanz, et al., "Radon and Projection Transform-Based Computer Vision", Algorithms, A Pipeline Architecture and Industrial Applications, pp. 12-41and 54-55 and 71, Springer-Verlag, (1987).
Sonka, et al., "Image Processing, Analysis and Machine Vision", Chapman and Hall Computing, pp. 224-225 (1993).
Svalbe, et al., "Quantised Angular Momentum Vectors and Projection", Published in the 13th International Conference on Discrete Geometry for Computer Imagery, Szeged: Hungry, (2006).
Umbaugh, "Computer Imaging", Digital Image Analysis and Processing, CRC Press, pp. 86-93 (2005).
Viard-Gaudin, et al., "A Bar Code Location Algorithm Using a Two-Dimensional Approach", IEEE, (Jul. 1993).
Wittman, "Decreasing Blur and Increasing Resolution in BarCode Scanning", IMA Industrial Problems Seminar, (Oct. 29, 2004).
Wolfram Mathematica, "Radon: Definition", http://reference.wolfram.com/mathematica/ref/Radon.html, (at least as early as Oct. 7, 2011).
Texas Instruments Reference Guide, TMS320C64x/C64x+ DSP, CPU and Instruction Set, Literature Number: SPRU732H, Oct. 2008 (Submitted in 4 Parts).
Texas Instruments User's Guide, TMS320DM643x DMP, Enhanced Direct Memory Access (EDMA3), Literature Number: SPRU987A, Mar. 2008.
Foley, et al., "Basic Raster Graphics Algorithms for Drawing 2D Primitives", 1996, pp. 132-143, Published in: US.
Stephenson, et al., "Why Step When You Can Run?", "Computer Graphics and Applications", Nov. 2000, pp. 76-84, vol. 20, No. 6, Publisher: IEEE, Published in: US.

\* cited by examiner

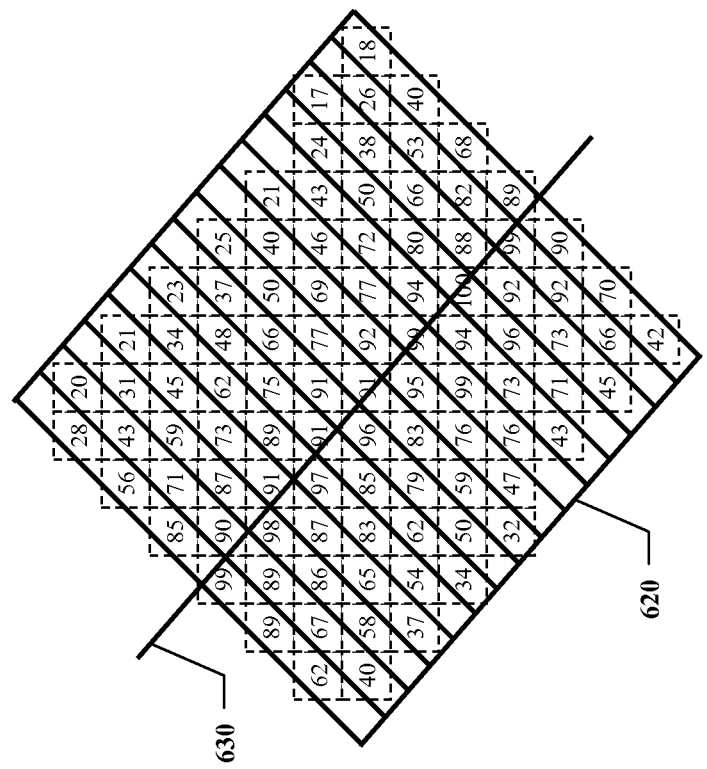
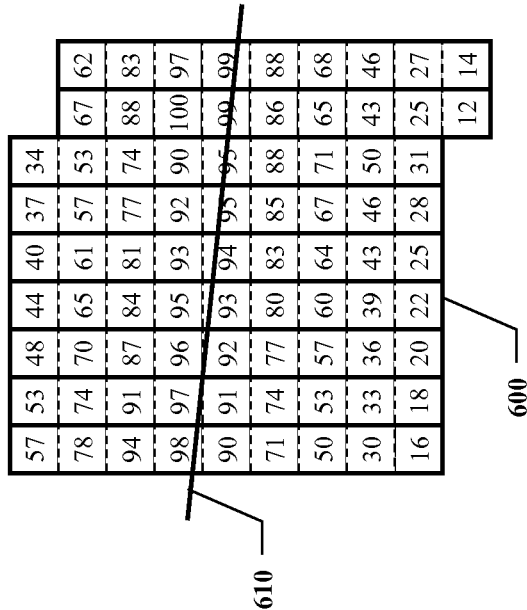
Fig 6

```
typedef struct
{
  unsigned      nextBin     : 1;
  unsigned      pixelOffset : 15;
  unsigned char binWeight0;
  unsigned char binWeight1;
}
ControlWord;
```

1000

```
unsigned char* pixelAddress;
unsigned int*  binAddress;
int            count;
ControlWord*   controlAddress;
int            moduleSize;
int            moduleOffset;
```

1010

```
unsigned int  bin0 = 0, bin1 = 0;
int           controlLoopCount = 0;
```

1020

```
while (count--)
{
  ControlWord cw = controlAddress[controlLoopCount];
  int pixel = pixelAddress[cw.pixelOffset];
  bin0 += pixel * cw.binWeight0;
  bin1 += pixel * cw.binWeight1;
  if (cw.nextBin)
  {
    *binAddress++ = bin0;
    bin0 = bin1;
    bin1 = 0;
  }
  if (++controlLoopCount == moduleSize)
  {
    pixelAddress += moduleOffset;
    controlLoopCount = 0;
  }
}
```

```
typedef enum DmaStyles
{
  BlockStyle,      // for shallow angles
  TwoDStyle,       // 2D transfer up to 45 degrees
  ThreeDStyle,     // 3D transfer up to 45 degrees
  V2DStyle,        // 2D transfer above 45 degrees
  V3DStyle         // 3D transfer above 45 degrees
}
DmaStyles;
```

1700

```
typedef struct
{
  // Basic module data
  unsigned char   num, denom;      // ratio is slope
  unsigned char   numBins;         // number of bins = period P
  unsigned char   oneSlice;        // true for single-slice templates
  short           x0, y0;          // S16.8 vector from center of first
                                   // valid bin to center of anchor pixel
  // DMA parameters
  DmaStyles       style;           // DMA style
  unsigned char   aCount;          // byte count for first dimension
  unsigned char   baseCount;
  unsigned char   extraSliceIndex;
  signed   char   bOffset;
  signed   char   orgX, orgY;      // integer vector from anchor pixel
                                   // to DMA start pixel
  const c_UInt8*  controlCodes;    // pointer to control codes
}
ModuleSrc;
```

```
{  7, 12, 19, 0,  0x01BE, -0xC2BE, 2, 19, 1, 17, 2, -16, 0, mod07x12 }  /* 30.26 */,
{ 13, 22, 35, 0,  0x01DF, -0xC35F, 2, 22, 1, 18, 2, -20, 0, mod13x22 }  /* 30.59 */,
{  3,  5,  8, 0,  0x01F0, -0xC370, 2, 19, 3,  1, 2, -17, 0, mod03x05 }  /* 30.96 */,
{  8, 13, 21, 0,  0x01E2, -0xC362, 2, 20, 1, 16, 2, -18, 0, mod08x13 }  /* 31.61 */,
{  5,  8, 13, 0,  0x01E2, -0xC362, 2, 19, 2,  3, 2, -17, 0, mod05x08 }  /* 32.01 */,
{  7, 11, 18, 0,  0x0224, -0xC3A4, 2, 19, 1, 17, 2, -18, 0, mod07x11 }  /* 32.47 */,
{ 15, 23, 38, 0,  0x01A5, -0xC325, 2, 23, 1, 15, 2, -21, 0, mod15x23 }  /* 33.11 */,
{  2,  3,  5, 0,  0x022D, -0xC3AD, 2, 17, 4,  1, 2, -16, 0, mod02x03 }  /* 33.69 */,
{ 13, 19, 32, 0,  0x0208, -0xC388, 2, 22, 1, 16, 1, -15, 0, mod13x19 }  /* 34.38 */,
{  7, 10, 17, 0,  0x01E9, -0xC369, 2, 18, 1, 15, 1, -14, 0, mod07x10 }  /* 34.99 */,
{  5,  7, 12, 0,  0x016B, -0xC2EB, 2, 17, 2,  2, 1, -13, 0, mod05x07 }  /* 35.54 */,
{  8, 11, 19, 0,  0x01EC, -0xC36C, 2, 18, 1, 15, 1, -14, 0, mod08x11 }  /* 36.03 */,
{ 17, 23, 40, 0,  0x016D, -0xC2ED, 2, 20, 1, 13, 1, -12, 0, mod17x23 }  /* 36.47 */,
{  3,  4,  7, 0,  0x016E, -0xC2EE, 2, 15, 2,  6, 1, -12, 0, mod03x04 }  /* 36.87 */,
{ 10, 13, 23, 0,  0x016F, -0xC2EF, 2, 17, 1, 13, 1, -12, 0, mod10x13 }  /* 37.57 */,
{ 11, 14, 25, 0,  0x0171, -0xC2F1, 2, 17, 1, 13, 1, -12, 0, mod11x14 }  /* 38.16 */,
{  4,  5,  9, 0,  0x0172, -0xC2F2, 2, 15, 2,  4, 1, -12, 0, mod04x05 }  /* 38.66 */,
{  9, 11, 20, 0,  0x0173, -0xC373, 2, 18, 1, 14, 1, -15, 0, mod09x11 }  /* 39.29 */,
{  5,  6, 11, 0,  0x0274, -0xC2F4, 2, 15, 2,  2, 1, -13, 0, mod05x06 }  /* 39.81 */,
{ 11, 13, 24, 0,  0x0205, -0xC285, 2, 15, 1, 10, 1, -11, 0, mod11x13 }  /* 40.24 */,
{  6,  7, 13, 0,  0x0176, -0xC276, 2, 14, 1, 10, 1, -11, 0, mod06x07 }  /* 40.60 */,
{  7,  8, 15, 1,  0x0205, -0xC305, 2, 14, 1, 10, 1, -11, 0, mod07x08 }  /* 41.19 */,
{  8,  9, 17, 1,  0x01FE, -0xC2FE, 2, 14, 1, 10, 1, -11, 0, mod08x09 }  /* 41.63 */,
{ 10, 11, 21, 1,  0x0172, -0xC2F2, 2, 14, 1, 10, 1, -11, 0, mod10x11 }  /* 42.27 */,
{ 13, 14, 27, 1,  0x01E8, -0xC2E8, 2, 14, 1, 10, 1, -11, 0, mod13x14 }  /* 42.88 */,
{ 19, 20, 39, 1,  0x01DC, -0xC2DC, 2, 14, 1, 10, 1, -11, 0, mod19x20 }  /* 43.53 */,
{ 36, 37, 73, 1,  0x01CF, -0xC2CF, 2, 14, 1, 10, 1, -11, 0, mod36x37 }  /* 44.22 */,
{ 73, 74,147, 1,  0x01C7, -0xC2C7, 2, 13, 1,  9, 1, -10, 0, mod73x74 }  /* 44.61 */,
{  1,  1,  2, 1,  0x01C0, -0xC2C0, 1, 12, 5,  1, 1, -10, 0, mod01x01 }  /* 45.00 */,
{ 74, 73,147, 1, -0x02C7,  0xC1C7, 4, 13, 1, 10, 1,  -7,-5, mod73x74 }  /* 45.39 */,
{ 37, 36, 73, 1, -0x02CF,  0xC1CF, 4, 13, 1, 10, 1,  -7,-5, mod36x37 }  /* 45.78 */,
{ 20, 19, 39, 1, -0x02DC,  0xC1DC, 4, 13, 1, 10, 1,  -7,-5, mod19x20 }  /* 46.47 */,
{ 14, 13, 27, 1, -0x02E8,  0xC1E8, 4, 13, 1, 10, 1,  -7,-5, mod13x14 }  /* 47.12 */,
{ 11, 10, 21, 1, -0x02F2,  0xC1F2, 4, 13, 1, 10, 1,  -7,-5, mod10x11 }  /* 47.73 */,
{  9,  8, 17, 1, -0x02FE,  0xC1FE, 4, 13, 1, 10, 1,  -7,-5, mod08x09 }  /* 48.37 */,
{  8,  7, 15, 1, -0x03C5,  0xC205, 4, 13, 1, 10, 1,  -7,-5, mod07x08 }  /* 48.81 */,
{  7,  6, 13, 0, -0x0276,  0xC1F6, 4, 12, 1, 10, 1,  -6,-5, mod06x07 }  /* 49.40 */,
{ 13, 11, 24, 0, -0x0285,  0xC205, 4, 13, 1,  9, 1,  -7,-5, mod11x13 }  /* 49.76 */,
{  6,  5, 11, 0, -0x0274,  0xC274, 4, 12, 1,  8, 1,  -5,-5, mod05x06 }  /* 50.19 */,
{ 11,  9, 20, 0, -0x0373,  0xC1F3, 4, 13, 1,  7, 1,  -5,-4, mod09x11 }  /* 50.71 */,
{  5,  4,  9, 0, -0x0272,  0xC172, 4, 12, 1,  7, 1,  -5,-4, mod04x05 }  /* 51.34 */,
{ 14, 11, 25, 0, -0x02F1,  0xC171, 4, 14, 1,  7, 1,  -7,-4, mod11x14 }  /* 51.84 */,
{ 13, 10, 23, 0, -0x02EF,  0xC16F, 4, 14, 1,  7, 1,  -7,-4, mod10x13 }  /* 52.43 */,
{  4,  3,  7, 0, -0x02EE,  0xC16E, 4, 12, 2,  0, 1,  -5,-4, mod03x04 }  /* 53.13 */,
{ 23, 17, 40, 0, -0x02ED,  0xC16D, 4, 17, 1,  7, 1, -10,-4, mod17x23 }  /* 53.53 */,
{ 11,  8, 19, 0, -0x036C,  0xC1EC, 4, 14, 1,  6, 1,  -6,-4, mod08x11 }  /* 53.97 */,
{  7,  5, 12, 0, -0x02EB,  0xC16B, 4, 13, 1,  7, 1,  -6,-4, mod05x07 }  /* 54.46 */,
{ 10,  7, 17, 0, -0x0369,  0xC1E9, 4, 14, 1,  6, 1,  -6,-4, mod07x10 }  /* 55.01 */,
{ 19, 13, 32, 0, -0x0388,  0xC208, 4, 16, 1,  6, 1,  -8,-4, mod13x19 }  /* 55.62 */,
{  3,  2,  5, 0, -0x03AD,  0xC22D, 4, 12, 2,  2, 1,  -4,-5, mod02x03 }  /* 56.31 */,
{ 23, 15, 38, 0, -0x0325,  0xC1A5, 4, 18, 1,  6, 1, -11,-4, mod15x23 }  /* 56.89 */,
{ 11,  7, 18, 0, -0x03A4,  0xC224, 4, 15, 1,  7, 1,  -7,-5, mod07x11 }  /* 57.53 */,
{  8,  5, 13, 0, -0x0362,  0xC1E2, 4, 13, 1,  6, 1,  -5,-4, mod05x08 }  /* 57.99 */,
{ 13,  8, 21, 0, -0x0362,  0xC1E2, 4, 15, 1,  6, 1,  -7,-4, mod08x13 }  /* 58.39 */,
{  5,  3,  8, 0, -0x0370,  0xC1F0, 4, 12, 1,  5, 1,  -4,-4, mod03x05 }  /* 59.04 */,
{ 22, 13, 35, 0, -0x035F,  0xC1DF, 4, 19, 1,  5, 1, -11,-4, mod13x22 }  /* 59.42 */,
{ 12,  7, 19, 0, -0x02BE,  0xC15E, 4, 15, 1,  6, 1,  -8,-4, mod07x12 }  /* 59.74 */,
```

Fig 19

```
{  7,  4, 11, C, -0x035D,  0x01DD, 4, 13, L, 5, 1,  -5,-4, mod04x07 }  /* 60.26 */,
{  9,  5, 14, C, -0x041B,  0x019B, 4, 13, L, 5, 1,  -5,-4, mod05x09 }  /* 60.95 */,
{ 11,  6, 17, C, -0x025A,  0x00DA, 4, 15, L, 5, 1,  -8,-3, mod06x11 }  /* 61.39 */,
{ 13,  7, 20, C, -0x03BA,  0x013A, 4, 15, L, 4, 1,  -7,-3, mod07x13 }  /* 61.70 */,
{ 17,  9, 26, C, -0x0419,  0x0199, 4, 18, L, 3, 1,  -9,-3, mod09x17 }  /* 62.10 */,
{ 33, 17, 50, C, -0x0257,  0x00D7, 4, 26, L, 4, 1, -19,-3, mod17x33 }  /* 62.74 */,
{  2,  1,  3, C, -0x03D5,  0x0155, 4, 11, 2, 1, 0,  -2,-3, mod01x02 }  /* 63.43 */,
{ 53, 26, 79, C, -0x03D4,  0x0154, 4, 36, L, 4, 0,  -2,-3, mod26x53 }  /* 63.87 */,
{ 27, 13, 40, C, -0x03A3,  0x0123, 4, 23, L, 4, 0,  -2,-3, mod13x27 }  /* 64.29 */,
{ 15,  7, 22, C, -0x03CB,  0x0142, 4, 16, L, 3, 0,  -1,-3, mod07x15 }  /* 64.98 */,
{ 11,  5, 16, C, -0x03C8,  0x0148, 4, 14, L, 3, 0,  -1,-3, mod05x11 }  /* 65.56 */,
{  9,  4, 13, C, -0x034F,  0x00CF, 4, 13, L, 4, 0,  -2,-3, mod04x09 }  /* 66.04 */,
{ 16,  7, 23, C, -0x034E,  0x00CE, 4, 16, L, 4, 0,  -2,-3, mod07x16 }  /* 66.37 */,
{  7,  3, 10, C, -0x04CD,  0x018D, 4, 12, L, 3, 0,  -1,-3, mod03x07 }  /* 66.80 */,
{ 19,  8, 27, C, -0x034C,  0x00CC, 4, 17, L, 4, 0,  -2,-3, mod08x19 }  /* 67.17 */,
{ 17,  7, 24, C, -0x03FD,  0x017D, 4, 16, L, 3, 0,  -1,-3, mod07x17 }  /* 67.62 */,
{  5,  2,  7, C, -0x0349,  0x00C9, 4, 11, L, 4, 0,  -2,-3, mod02x05 }  /* 68.20 */,
{ 18,  7, 25, C, -0x03C8,  0x0148, 4, 16, L, 3, 0,  -1,-3, mod07x18 }  /* 68.75 */,
{  8,  3, 11, C, -0x03C6,  0x0146, 4, 12, L, 3, 0,  -1,-3, mod03x08 }  /* 69.44 */,
{ 19,  7, 26, C, -0x03C5,  0x0085, 4, 16, L, 3, 0,  -2,-2, mod07x19 }  /* 69.78 */,
{ 14,  5, 19, C, -0x0443,  0x00C3, 4, 14, L, 2, 0,   0,-2, mod05x14 }  /* 70.35 */,
{ 26,  9, 35, C, -0x0442,  0x00C2, 4, 18, L, 2, 0,   0,-2, mod09x26 }  /* 70.91 */,
{  3,  1,  4, C, -0x0420,  0x00A0, 4, 11, L, 2, 0,  -1,-2, mod01x03 }  /* 71.57 */,
{ 31, 10, 41, C, -0x043E,  0x00BE, 4, 19, L, 2, 0,   0,-2, mod10x31 }  /* 72.12 */,
{ 16,  5, 21, C, -0x043D,  0x00DD, 4, 14, L, 2, 0,   0,-2, mod05x16 }  /* 72.65 */,
{ 10,  3, 13, C, -0x03C8,  0x009C, 4, 12, L, 2, 0,  -1,-2, mod03x10 }  /* 73.30 */,
{ 17,  5, 22, C, -0x043F,  0x0069, 4, 14, L, 2, 0,   0,-2, mod05x17 }  /* 73.61 */,
{  7,  2,  9, C, -0x031D,  0x004F, 4, 12, L, 2, 0,  -2,-2, mod02x07 }  /* 74.05 */,
{ 11,  3, 14, C, -0x03F8,  0x00BF, 4, 12, L, 2, 0,  -1,-2, mod03x11 }  /* 74.74 */,
{ 23,  6, 29, C, -0x0486,  0x006E, 4, 15, L, 2, 0,   0,-2, mod06x23 }  /* 75.38 */,
{  4,  1,  5, C, -0x03B3,  0x00B3, 4, 10, L, 1, 0,  -1,-2, mod01x04 }  /* 75.96 */,
{ 25,  6, 31, C, -0x03B2,  0x00B2, 4, 15, L, 1, 0,  -1,-2, mod06x25 }  /* 76.50 */,
{ 13,  3, 16, C, -0x02F8, -0x0008, 4, 12, L, 1, 0,  -1,-1, mod03x13 }  /* 77.01 */,
{  9,  2, 11, C, -0x042A,  0x0047, 4, 11, L, 0, 0,   0,-1, mod02x09 }  /* 77.47 */,
{ 19,  4, 23, C, -0x0448,  0x0024, 4, 13, L, 1, 0,   0,-1, mod04x19 }  /* 78.11 */,
{  5,  1,  6, C, -0x046F,  0x006A, 4, 10, L, 0, 0,   0,-1, mod01x05 }  /* 78.69 */,
{ 16,  3, 19, C, -0x043C,  0x000F, 4, 12, L, 0, 0,   0,-1, mod03x16 }  /* 79.38 */,
{ 17,  3, 20, C, -0x03FA,  0x002F, 4, 12, L, 0, 0,   0,-1, mod03x17 }  /* 79.99 */,
{  6,  1,  7, C, -0x02A5, -0x005B, 4, 10, L, 1, 0,  -2,-1, mod01x06 }  /* 80.54 */,
{ 25,  4, 29, C, -0x0444,  0x0084, 4, 13, L, 0, 0,   0,-1, mod04x25 }  /* 80.91 */,
{ 13,  2, 15, C, -0x0422,  0x00A2, 4, 11, L, 1, 0,   0,-2, mod02x13 }  /* 81.25 */,
{  7,  1,  8, C, -0x03C0,  0x0040, 4, 10, L, 0, 0,   0,-1, mod01x07 }  /* 81.87 */,
{ 15,  2, 17, C, -0x02F0, -0x0072, 4, 11, L, 0, 0,  -1, 0, mod02x15 }  /* 82.41 */,
{  8,  1,  9, C, -0x0461, -0x0003, 4, 10, L, 0, 0,   0,-1, mod01x08 }  /* 82.87 */,
{ 17,  2, 19, C, -0x03FC,  0x0065, 4, 11, 0, 18, 0,  0, 0, mod02x17 }  /* 83.29 */,
{  9,  1,  9, 1, -0x0327, -0x0100, 4,  9, 0,  8, 0,  0, 0, mod01x09 }  /* 83.66 */,
{ 10,  1, 10, 1, -0x032E, -0x0100, 4,  9, 0,  9, 0,  0, 0, mod01x10 }  /* 84.29 */,
{ 11,  1, 11, 1, -0x0334, -0x0100, 4,  9, 0, 10, 0,  0, 0, mod01x11 }  /* 84.81 */,
{ 12,  1, 12, 1, -0x0339, -0x0100, 4,  9, 0, 11, 0,  0, 0, mod01x12 }  /* 85.24 */,
{ 13,  1, 13, 1, -0x033E, -0x0100, 4,  9, 0, 12, 0,  0, 0, mod01x13 }  /* 85.60 */,
{ 15,  1, 15, 1, -0x0346, -0x0100, 4,  9, 0, 14, 0,  0, 0, mod01x15 }  /* 86.19 */,
{ 17,  1, 17, 1, -0x034C, -0x0100, 4,  9, 0, 16, 0,  0, 0, mod01x17 }  /* 86.63 */,
{ 21,  1, 21, 1, -0x0356, -0x0100, 4,  9, 0, 20, 0,  0, 0, mod01x21 }  /* 87.27 */,
{ 28,  1, 28, 1, -0x0360, -0x0100, 4,  9, 0, 27, 0,  0, 0, mod01x28 }  /* 87.95 */,
{ 41,  1, 41, 1, -0x036A, -0x0100, 4,  9, 0, 40, 0,  0, 0, mod01x41 }  /* 88.60 */,
{ 82,  1, 82, 1, -0x0375, -0x0100, 4,  9, 0, 81, 0,  0, 0, mod01x82 }  /* 89.30 */,
{  1,  0,  1, 1, -0x0480, -0x0100, 3, 10, 0,  0, 0,  0, 0, mod00x01 }  /* 90.00 */
};
```

Fig 20

METHODS AND APPARATUS FOR ONE-DIMENSIONAL SIGNAL EXTRACTION

CROSS REFERENCE TO RELATED APPLICATIONS

This application relates to and is assigned to the same entity as the co-pending application entitled "Methods and Apparatus for One-Dimensional Signal Extraction," U.S. patent application Ser. No. 13/336,291, filed on Dec. 23, 2011, the disclosure of which is hereby incorporated herein by reference in its entirety.

TECHNICAL FIELD

The technical field relates generally to digital electronic methods and apparatus, including computer program products, for extracting a one-dimensional digital signal from a two-dimensional digital image.

BACKGROUND

In digital image processing applications it can be desirable to extract a one-dimensional (1D) signal along a line in a two-dimensional (2D) digital image. Such applications can include, for example, inspection, measurement, and guidance for electronics, semiconductor, and general manufacturing, and barcode and other symbology reading.

The term projection is sometimes used to refer to the act of extracting a one-dimensional signal along a line, herein called a projection line, in a two-dimensional image. The term is sometimes also applied to the 1D signal itself, and sometimes has other meanings in the field of digital image processing.

In some methods or systems the projection line is restricted to lie along rows, columns, or diagonals of a digital image. In such cases a 1D signal can be extracted from pixel values that lie exactly on the projection line. The 1D signal can have samples that are one pixel apart for rows and columns, and $\sqrt{2}$ pixels apart for diagonals (assuming square pixels).

In other methods or systems where the projection line lies along rows, columns, or diagonals of a digital image, a 1D signal is extracted by summing or averaging pixel values perpendicular to the projection line. For example, if a projection lies along row 20 of a digital image, each sample of a 1D signal along that line can be the sum or average of pixel values along a portion of a column that includes rows 18, 19, 20, 21, and 22.

When a projection line does not lie along a row, column, or diagonal, pixels that lie exactly on the line, or in a direction perpendicular to the line, are in general sparsely located or nearly nonexistent. In some methods or systems where the projection line is not restricted to lie along rows, columns, or diagonals, therefore, a 1D signal is extracted from a set of pixels that approximately follows the projection line. One example of such a method is the so-called Bresenham line following method, which typically makes one-pixel steps along rows, columns, or diagonals in such a manner that the pixels visited lie approximately along the projection line.

In another method, herein referred to as linear convolution, a 1D signal is extracted by convolving the digital image with a 2D filter kernel at positions chosen by a Bresenham line following method. The filter kernel is designed to provide summing or averaging roughly perpendicular to the projection line. The filter kernel can have uniform weights, or the weights can become smaller for pixels farther from the projection line.

In another method, herein called skewed projection, pixels in a parallelogram pattern are used to extract a 1D signal. The parallelogram has two sides that lie along rows of the image, and the other two sides are at some skew angle, generally not along columns. The parallelogram is thus comprised of a certain number of consecutive pixels from each of a certain number of consecutive rows, with the starting columns for the pixels of the rows offset to approximately follow the skew angle. The 1D signal is formed by summing or averaging in the skew direction.

In another method, herein referred to as nearest neighbor projection, a grid of points are chosen that lie at some spacing along a projection line, typically one pixel, and at some spacing perpendicular to the projection line, typically also one pixel. The image coordinates of those points are rounded to the nearest integer so that they fall on pixel coordinates, and the pixels so specified are used to extract the 1D signal by summing or averaging approximately (in the nearest neighbor sense) perpendicular to the projection line.

In other methods, herein called bi-linear interpolation and bi-cubic interpolation, a grid of points is chosen in a manner similar to that used for nearest neighbor projection. Instead of rounding a point's coordinates to integers, however, the coordinates are used to compute an interpolated pixel value. These interpolated values are used to extract the 1D signal by summing or averaging perpendicular to the projection line. Formulas for bi-linear and bi-cubic interpolation are well known in the art.

Nearest neighbor projection and the interpolation methods achieve equivalent results as rotating the digital image so that the projection line lies along a row or column of the (rotated) image, and then summing or averaging perpendicular to the projection line. Here "equivalent" refers to the 1D signal obtained, but not necessarily the time needed to obtain it. Rotating a digital image is a type of image processing operation commonly called digital re-sampling.

In another method, equally-spaced lines are constructed perpendicular to a projection line. A 1D signal is extracted by a weighted summation of pixels along the perpendicular lines, where the weights are proportional to the length of the intersection of a line and a pixel.

SUMMARY

The present disclosure is directed to digital electronic methods and apparatus for extracting a one-dimensional (1D) signal from a two-dimensional (2D) digital image along a projection line.

In some embodiments, a 1D signal is extracted using a repeating sequence of pixel weight templates, placed at a sequence of relative positions in the digital image. A pixel weight template is a plurality of weights arranged in a pattern on a grid whose geometry corresponds to the pixel grid of a digital image. There are at least two distinct (non-identical) pixel weight templates in a repeating sequence. A 1D signal is extracted by computing a sequence of weighted sums of pixels using a repeating sequence of pixel weight templates applied at a sequence of relative positions.

In some embodiments, a repeating sequence of pixel weight templates, and a sequence of relative positions, are selected in response to the orientation of a projection line. For any particular orientation various properties of the sequence can be selected, for example the number of templates in the sequence, the pattern and values of the weights, and the extent to which the templates of the sequence overlap. In some embodiments these properties can further include the total weights, centers of mass, and/or blur of the templates. In some embodiments these selections can be made to achieve certain desirable characteristics of the 1D signal, for example photometric accuracy, geometric accuracy, resolution, and noise reduction.

In some embodiments the selection of a sequence of pixel weight templates depends on whether the orientation of a projection line is, or is close to, parallel to one of the pixel grid axes, or is, or is close to, a diagonal of the pixel grid.

Various apparatus for extracting a 1D signal from a two-dimensional (2D) digital image along a projection line are disclosed. Some embodiments use computer software running on a programmable device such as a microprocessor. Some embodiments use a computational device that does not primarily rely on software, for example a field-programmable gate array.

In some embodiments, a set of K registers is used to hold partial sums, where K is at least two. Pixels are fetched from an image memory, and weights are fetched from a table memory. One or more multiply-accumulators, or any computational equivalent, are used to multiply each pixel by K weights and add the products to the set of K registers. The set of registers can be linearly shifted, so that a zero is shifted in one end of the set and a sample of a 1D signal is shifted out of the other end. In some embodiments that use a programmable device such as microprocessor, a dot product instruction is used to control the one or more multiply-accumulators.

In some embodiments, a portion of a digital image is transferred from an image memory to a working memory using a direct memory access (DMA) controller. The transfer pattern is selected in response to the orientation of a projection line. For any particular orientation, a transfer template is selected that, when combined with information about the location in image memory and length of a projection line, produces a set of DMA parameters that can be used by the controller to transfer the pixels.

The use of DMA as further described herein can achieve desirable properties, for example reasonably sequential memory access, overlap of fetching and processing of pixels, and the ability to use address offsets for pixels without advance knowledge of the image row pitch and length of the projection line.

Other aspects and advantages will become apparent from the following detailed description, taken in conjunction with the accompanying drawings, illustrating the principles of the digital electronic methods and apparatus by way of example only.

BRIEF DESCRIPTION OF THE DRAWINGS

The foregoing and other aspects, features, and advantages of the present digital electronic methods and apparatus, as well as the digital electronic methods and apparatus themselves, will be more fully understood from the following description of various embodiments, when read together with the accompanying drawings.

FIG. 6 illustrates a projection line 610 in the parallel zone, of orientation whose slope is one pixel down per nine pixels to the right.

FIG. 10 is a portion of a computer program in the C language that can be used in embodiments that comprise a microprocessor or other programmable computing device.

FIG. 17 provides declarations in the C programming language for specifying a module in an illustrative embodiment.

FIGS. 18, 19, and 20 illustrate module data for a particular set of 171 allowable orientations.

DETAILED DESCRIPTION

In the following detailed description of the illustrative embodiments, reference is made to the accompanying drawings which form a part hereof, and in which are shown by way of illustration specific embodiments in which the methods or apparatus described herein may be practiced. It is to be understood that other embodiments may be utilized and structural changes may be made without departing from the scope of the invention.

Figure 1:
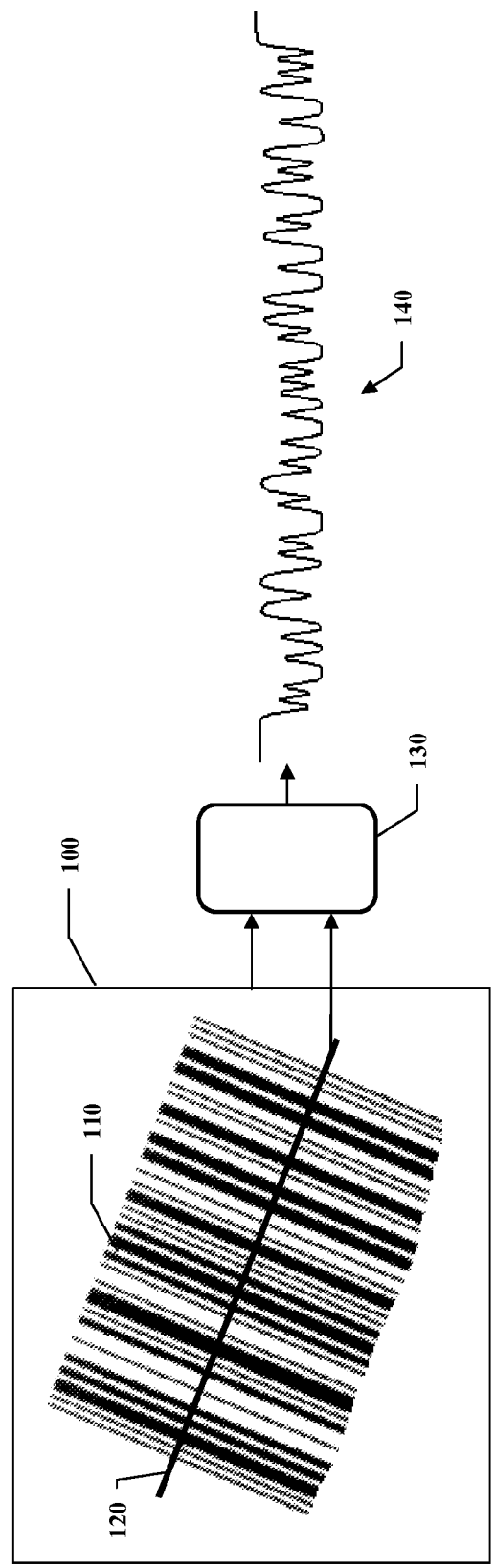
FIG. 1 illustrates an exemplary apparatus for one-dimensional signal extraction.

FIG. 1 illustrates an exemplary apparatus for one-dimensional signal extraction. A two-dimensional (2D) digital image 100 is received, for example from a camera, scanner, or computer rendering. The digital image 100 may contain features, such as for example barcode 110. Information describing a projection line 120 is received, along which it is considered desirable to extract a one-dimensional digital signal, for example signal 140 which corresponds to example feature barcode 110. A digital electronic apparatus 130 extracts signal 140 from image 100 along projection line 120.

One-dimensional digital signal 140 generally comprises a sequence of values, often called samples or projection bins. A value can be a single number or a set of numbers such as a complex number or a vector, for example a color vector. The numbers can be encoded in various formats, such as binary integers or floating-point values.

The orientation of projection line 120 relative to digital image 100 is one of a set of allowable orientations, which can include all orientations that can be encoded in the received information describing projection line 120, and can further be restricted to a range, such as 0-45°; to orientations with rational slopes; to orientations selected as being favorable according to some metric; to orientations selected at random; or to any other suitable restriction or combination of restrictions.

Apparatus 130 may select among multiple strategies to extract signal 140 from image 100, where strategies are selected depending on the orientation of projection line 120. For a given embodiment, the various teachings herein can applied differently for different orientations, and may be applied not at all for some orientations without departing from the scope of the invention. The strategy can be selected to achieve favorable results according to some metric for a given orientation.

It is noted that while a barcode is used as an example in places herein, it is well known that extracting a 1D signal along a projection line in a digital image is useful for a variety of applications, for example in the manufacture of printed circuit boards, solar panels, and integrated circuits. One such application in integrated circuit manufacturing is locating leads on lead frames during wire bonding. Thus the barcode examples herein are by way of illustration only, and are not to be considered limiting.

Figure 2:
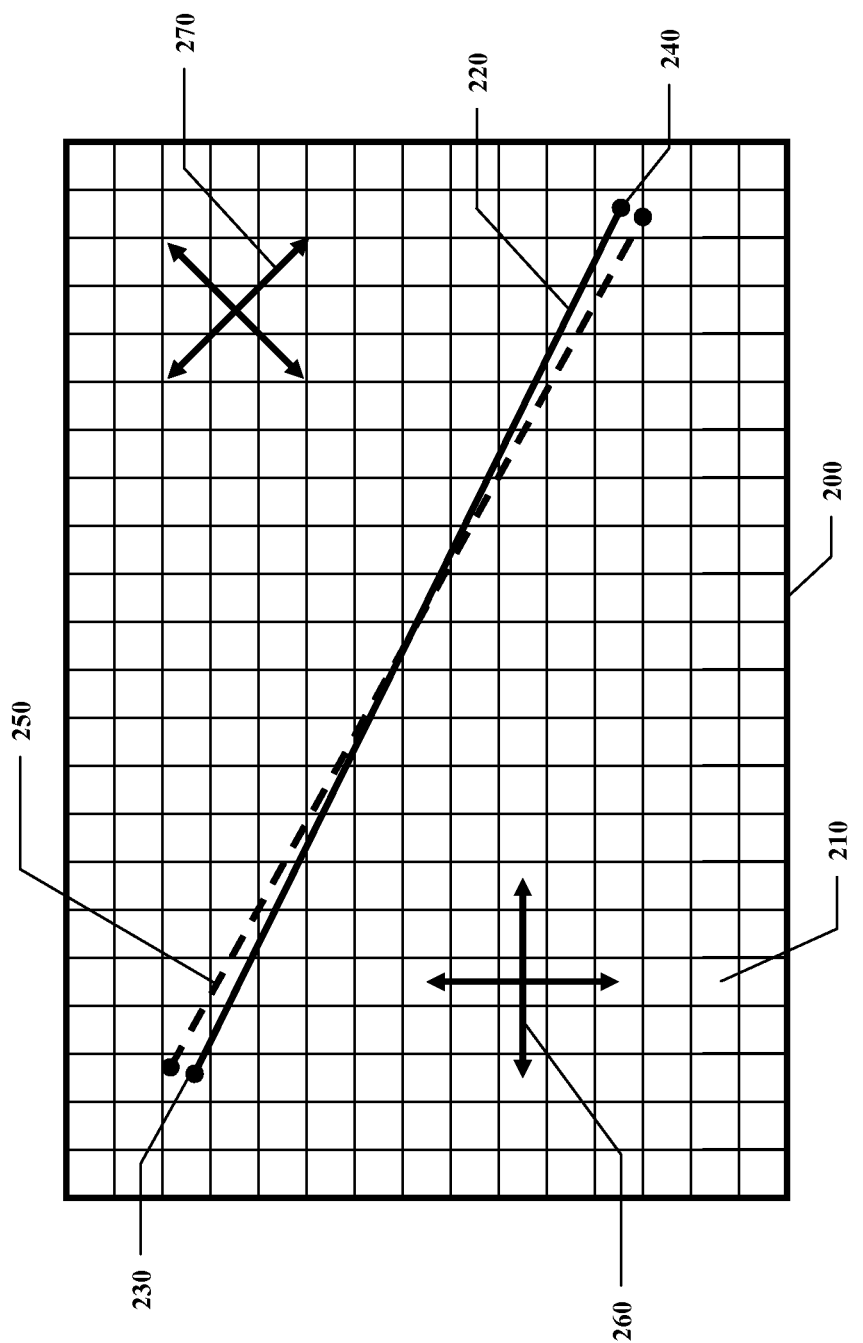
FIG. 2 illustrates an array of pixels arranged on a grid.

FIG. 2 illustrates an array of pixels arranged on a grid. A digital image, such as example digital image 100, comprises an array of pixels arranged on a grid, such as pixel grid 200. A pixel, such as example pixel 210, generally comprises a numerical value, or a set of numerical values, and a position within the pixel grid. The numerical values may be obtained from physical measurements, or may be synthetically generated, and may be encoded in a digital image in a variety of well-known ways, such as binary integers and floating point numbers. The term "pixel" is commonly used to refer to a numerical value at a position within a pixel grid; a unit of distance equal to the spacing between adjacent grid elements; and an electro-optical sensing element that measures image brightness.

Herein we generally use (x, y) to specify pixel coordinates on the grid. Pixels lie on integer coordinates, with non-integer coordinates referring to positions between pixels. The fractional portion of an image grid coordinate is often called a subpixel position or subpixel offset. Other schemes, for example considering pixels to lie on half-integer coordinates, are well-known and can also be used.

With continuing reference to the illustrative embodiments of FIG. 2, apparatus 130 receives information describing example projection line 220. The information can be in any form that can describe the line, such as the position of first endpoint 230 and second endpoint 240. Alternatively, the information might comprise the position of a point, a length, and an orientation; the coefficients of a linear equation; or any other suitable encoding.

In other illustrative embodiments, apparatus 130 indirectly receives information describing example projection line 220. First, apparatus 130 receives information describing requested projection line 250 (shown as a dashed line in FIG. 2). Then, information describing example projection line 220 is derived from the information describing requested projection line 250 by making small adjustments to its orientation, position, length, or other properties, so that example projection line 220 is similar to requested projection line 250 but at a more favorable alignment relative to pixel grid 200. In one embodiment, requested projection line 250 is rotated about its center to yield a more favorable orientation, for example an orientation listed in FIG. 18, 19, or 20 and further described below. In another embodiment, the endpoints of requested projection line 250 are moved to yield a more favorable subpixel offset, for example an offset selected as described in FIG. 7. In yet another embodiment, requested projection line 250 is both rotated and moved.

In the embodiments of FIG. 2, first endpoint 230 and second endpoint 240 are not in general located on integer grid positions. In some embodiments, the information describing a projection line allows subpixel positions to be received. In some embodiments, the above-described adjustments can result in subpixel positions. In other embodiments, the above-described adjustments eliminate subpixel positions. In still other embodiments, a projection line can have no specified endpoints, or only one specified endpoint, instead deriving missing endpoints from the boundaries of the digital image.

Example projection line 220 has an orientation relative to pixel grid 200. In various embodiments the orientation can be encoded as a number, or set of numbers, for example as an angle in degrees, radians, binary, or any suitable angular units; as the direction of a vector; as a slope or tangent; as a pair of numbers whose ratio is a slope or tangent; or any other suitable encoding. In embodiments that use a pair of numbers whose ratio is a slope or tangent, the denominator of the ratio can be 0, indicating a vertical line. The orientation of example projection line 220 can be obtained from the information describing it in a variety of ways. The orientation can be encoded directly in the information describing example projection line 220; can be calculated from the position of first endpoint 230 and second endpoint 240; can be calculated from the coefficients of a linear equation; can be derived as a result of the above-described adjustments; or can be obtained in any other suitable way.

A pixel grid generally defines certain special orientations. Pixel grid 200, for example, defines two special orientations 260 parallel to the grid axes. Pixel grids with square, rectangular, or parallelogram pixels will have these two special orientations, called herein parallel orientations. For pixel grids with square or rectangular pixels, the parallel orientations will be perpendicular to each other. For pixel grids with hexagonal pixels, there will be three parallel orientations 60° apart.

Pixel grid 200 also defines two special orientations 270 diagonal to the grid axes, separated by 45° from the parallel orientations. Pixel grids with square, rectangular, or parallelogram pixels will have these two special orientations, called herein diagonal orientations. For pixel grids with square pixels, the diagonal orientations will be separated by 45° from the parallel orientations.

Figure 3:
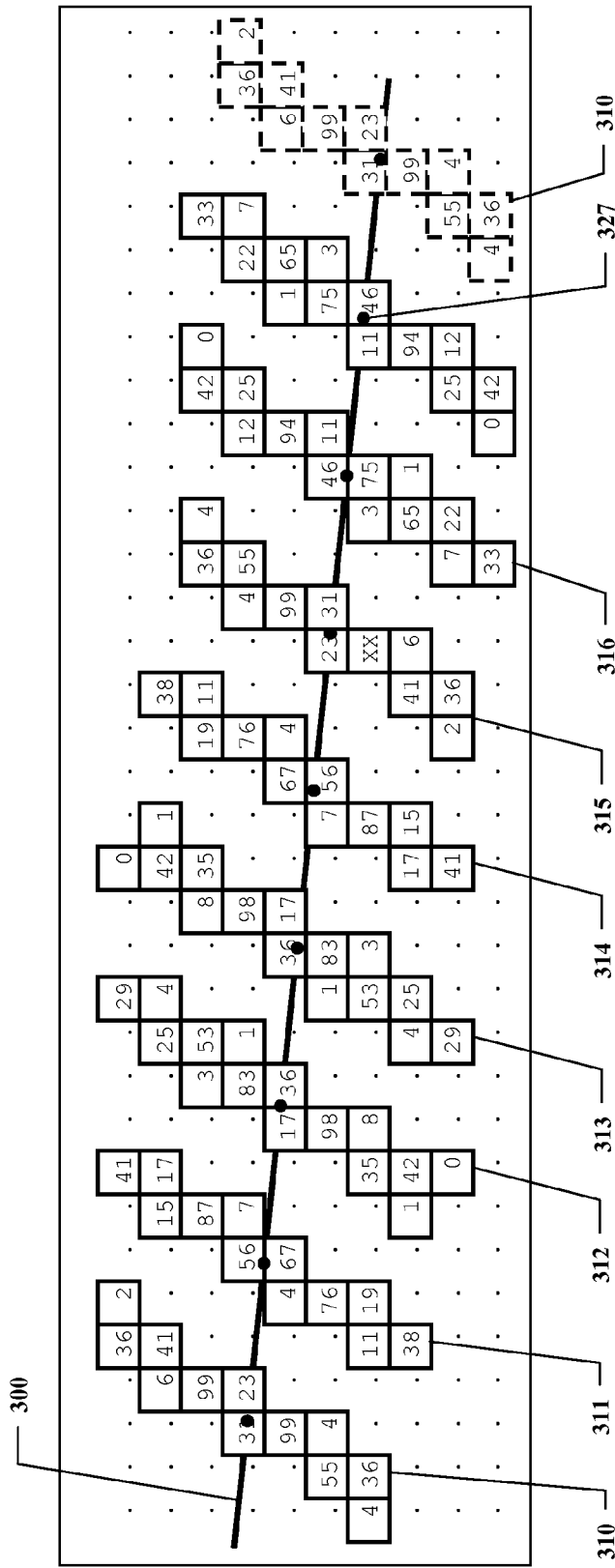
FIG. 3 shows an exemplary repeating sequence of pixel weight templates such as can be used in some embodiments of the invention.

FIG. 3 shows an exemplary repeating sequence of pixel weight templates such as can be used in some embodiments of the invention. A pixel weight template is a plurality of weights arranged in a pattern on a grid whose geometry (size and shape of grid elements) corresponds to the pixel grid of a digital image. A weight is a numeric quantity, for example an integer, real number, complex number, or vector, as further described below. The term element can be used herein to refer to a particular weight at a particular position within a template. Since the template grid geometry corresponds to a pixel grid, template positions and offsets can be described in units of pixels.

Example projection line 300 has orientation corresponding to a slope of three pixels down per five pixels to the right. A repeating sequence of pixel weight templates is selected for this orientation, comprising first template 310, second template 311, third template 312, fourth template 313, fifth template 314, sixth template 315, seventh template 316, and eighth template 317. The sequence repeats, so that first template 310 (shown with a dashed outline) follows eighth template 317, and so on. In the illustrative embodiment of FIG. 3, each template of the sequence is distinct from the others. In some embodiments, some of the templates can be identical, but there are at least two distinct templates.

A sequence of relative positions is selected that specifies relative locations within the digital image at which to apply the templates. In the illustrative embodiment of FIG. 3, the relative positions are shown by the placement of the templates on an expanded grid, where squares containing numbers or symbols represent template elements, and where dots represent points on the expanded grid corresponding to no template. The relative positions are such that the templates overlap and would be difficult to illustrate in the figure using a pixel grid; therefore, for explanatory purposes the templates have been placed on an expanded grid, so that they are separated by an extra three grid positions horizontally. To get the actual relative positions for the illustrated sequence of templates, shift second template 311 left three grid positions, third template 312 left six grid positions, fourth template 313 left nine grid positions, and so on.

The relative position of each template in the illustrated sequence of FIG. 3 is five pixels to the right, and three pixels down, from the position of the same template in the previous repetition of the sequence. This can be seen with first template 310, after shifting the dashed template left 24 grid positions as described above. This relative positioning of repeated templates, combined with the other relative positions shown in the figure (after proper shifting as described above), defines the relative positions corresponding to a repeating sequence of arbitrary length, including sequences that do not comprise a whole number of repetitions.

The numbers and symbols in the squares of FIG. 3 represent relative pixel weights, where the symbol xx represents 100. Methods and apparatus for calculating and using the weights are described throughout this specification. In one illustrative embodiment corresponding to FIG. 3, the weights are integers in the range 0-100. In another illustrative embodiment corresponding to FIG. 3, the weights are floating point values in the range 0-100, truncated for purposes of display to the integers shown in the figure, so that for example the weights displayed as "0" may be non-zero but less than 1. In other embodiments, weights are integers or floating point values in any suitable range, for example integers in the range 0-255 or floating point values in the range 0-1. In some embodiments weights can be negative, complex, or vectors as described elsewhere herein. The above ranges are arbitrary choices.

The illustrative embodiment of FIG. 3 extracts a one-dimensional signal along example projection line 300 by using a repeating sequence of the illustrated pixel weight templates at a sequence of relative positions in a digital image to compute a sequence of weighted sums of pixels of the digital image. A weighted sum is computed by placing a pixel weight template at a location in the digital image, multiplying the weights by the corresponding pixel values at that location, and summing the products. The multiplications and sums can be carried out in any order. Multiplication and summing can comprise any arithmetic, logical, table lookup, or other operations or combinations of operations that has the effect of multiplying and summing. The one-dimensional signal is the resulting sequence of weighted sums, or is derived from that sequence.

In some embodiments pixels or weights or both can be complex numbers, and a weighted sum is a complex sum of complex products. The 1D signal can be complex, or can comprise real values derived from the complex sums. In some embodiments, pixels or weights or both can be vectors. For example, pixels can be RGB color vectors, weights can be vectors, and weighted sums can be sums of dot products, resulting in a scalar-valued 1D signal. In another example, pixels can be RGB color vectors, weights can be scalars, and weighted sums can be vector sums of products, resulting in a vector-valued 1D signal.

The repeating sequence of pixel weight templates, and sequence of relative positions, illustrated in FIG. 3 are selected for the orientation of example projection line 300, specifically a slope of three pixels down per five pixels to the right. For other orientations, different repeating sequences of pixel weight templates and relative positions can be selected. In some embodiments selections of this nature are made for a majority of orientations, but for certain orientations other selections are made. For example, for certain orientations a repeating sequence of identical templates can be used; a non-repeating sequence can be used; a method not involving pixel weight templates of any kind can be used; or any suitable procedure or combination of procedures can be used. In some embodiments, the certain orientations comprise parallel orientations. In other embodiments, the certain orientations comprise parallel and diagonal orientations. In still other embodiments, the certain orientations comprise some minority of orientations where it is deemed favorable to make such selections.

A detailed computerized method for selecting the pixel weight templates and relative positions corresponding to the illustrative embodiment of FIG. 3, for the orientation of example projection line 300 and other orientations, as well as making those selections for various other embodiments, is given below in conjunction with FIG. 7, and in various other places herein.

The use of a repeating sequence of pixel weight templates, selected in response to the orientation of a projection line and for at least a majority of allowable orientations, provides flexibility in the design of a method or apparatus for extracting a one-dimensional signal. This flexibility can be used to achieve certain advantages in certain embodiments. Among the advantages that can be achieved are high accuracy, high resolution, good noise reduction, high speed of operation, computational simplicity, and other advantages that will be apparent to one of ordinary skill. Various embodiments can achieve each of these advantages in various degrees or not at all.

In various embodiments the advantages are, in whole or in part, due to the ability to select the pixel weights so as to achieve certain desirable properties of the templates. These properties can include the zeroth moment (total weight), which affects photometric accuracy, first moment (center of mass), which affects geometric accuracy, and second moments (blur), which affect resolution and noise reduction. The use of a repeating sequence of pixel weight templates, selected in response to the orientation of a projection line, can allow these moments to be selected independently of each other, so that, for example, the first moments can be selected to achieve high geometric accuracy, while the second moments can be selected independently to achieve a desired tradeoff between resolution and noise reduction.

In some embodiments, the pixel weight templates are selected so that the total weights of the templates are the same, or substantially the same. In these embodiments, the effective gain from the 2D image to the 1D signal is substantially constant and independent of position, resulting in high photometric accuracy. In an embodiment corresponding to FIG. 3, where the illustrated weighs are floating point values truncated for purposes of display to the integers shown in the figure, the total weights of the templates are the same to floating point precision. In an alternate embodiment where the illustrated weighs are integers as shown, the total weights of the templates are substantially the same, to a precision of about one-third of one percent.

In some embodiments, the pixel weight templates do not have substantially the same total weights. In these embodiments, photometric accuracy can be maintained by dividing each projection bin by a value proportional to the total weight of the template that produced the bin, or by multiplying by the reciprocal of such a value. Such adjustments need not be made, however, if photometric accuracy is of lesser concern in a given application.

A pixel weight template has a center of mass, defined as the weighted average position of the pixel weights of the template. For example, eighth template 317 has eighth center of mass 327. The other pixel weight templates of FIG. 3 have their centers of mass shown but with no reference number. A center of mass can be defined relative to each template, and it can be defined relative to a digital image for each placement of the template in the image. Thus a repeating sequence of pixel weight templates, when placed according to a sequence of relative positions, produces a sequence of centers of mass.

It is reasonable to consider the position in a digital image of a projection bin of a 1D signal to be the center of mass of the pixel weight template at the placement position that produced the projection bin. Thus the projection bins can be considered to have 2D positions, which may or may not lie along the projection line. Methods other than center of mass can also be used define 2D position. For example, if the weights are generated by a 2D function of position such as a parabola or Gaussian, then the position of a projection bin can be defined as the position of an extremum of the function.

It is useful to define two directions in the digital image relative to a projection line. The signal direction is defined to be parallel to the projection line, and the projection direction is defined to be some non-parallel direction as appropriate for a particular embodiment. In many embodiments the projection direction is perpendicular to the signal direction, but it need not be in general. It is further useful to consider the 2D position of a projection bin, and various other properties, to have a component, or coordinate, in the signal direction and a component, or coordinate, in the projection direction. The symbol u is used herein to refer to the signal direction coordinate, and the symbol v is used to refer to the projection direction coordinate.

The spacing between consecutive projection bins in the signal direction determines the geometric scaling (stretch or compression) of the 1D signal relative to the pixel spacing of the 2D image. If the bin spacing is uniform, the scaling will be uniform and the 1D signal will have high geometric accuracy, which means it will faithfully preserve the geometry (for example relative distances) of features in the image. In some applications, such as barcode reading, it is desirable to achieve high geometric accuracy.

If the position of the projection bins in the projection direction is constant (i.e. constant v coordinate), then the projection bins lie on the projection line or on a straight line parallel to it. This property, which in general is independent of the uniform scaling property, may also be desirable in a given application.

In some embodiments, the repeating sequence of pixel weight templates and corresponding sequence of relative positions are selected so that the centers of mass are evenly spaced along a straight line. The resulting one-dimensional signal will be uniformly scaled (stretched or compressed), and will therefore be of high geometrical accuracy. In some embodiments, the straight line is substantially parallel to the projection line. In some embodiments, the straight line is the projection line.

In an embodiment corresponding to FIG. 3, where the illustrated weights are floating point values truncated for purposes of display to the integers shown in the figure, the centers of mass of the pixel weights templates are evenly spaced along projection line 300 to very high precision. In an alternate embodiment where the illustrated weights are integers as shown, the centers of mass are evenly spaced to somewhat less precision, and yet still high relative to the size of a pixel.

The use of centers of mass to define the position of projection bins, and thereby to assess various properties of a method or apparatus that extracts a 1D signal from a 2D image, can be applied to any method or apparatus wherein projection bins are responsive to some linear combination of pixels, including the trivial case where projection bins are responsive to one pixel. Such methods include the prior art methods of Bresenham line following; linear convolution; nearest-neighbor projection; skewed projection; bi-linear interpolation; bi-cubic interpolation; and others.

Bresenham line following, linear convolution, and nearest-neighbor projection generally produce non-uniform scaling at non-parallel and non-diagonal orientations (i.e. at a majority of orientations), and therefore generally offer reduced geometrical accuracy. Skewed projection, bi-linear interpolation, and bi-cubic interpolation can produce uniform scaling at all orientations, but each can exhibit other undesirable limitations as will be seen herein.

It can be useful to consider the extent to which a method for 1D signal extraction blurs the signal. It can be further useful to consider blurring in the signal direction and in the projection direction.

It should first be noted that the process that produced the 2D digital image can introduce blurring that is separate from and independent of any blurring introduced by the signal extraction method. Such image formation blur can arise from a number or sources, including, for example, object motion, optical distortion and defocus, and the finite extent of the electro-optical pixels of a sensor.

The blur of a pixel weight template in a given direction (e.g. signal or projection direction) can be defined as the weighted standard deviation of position in the given direction, or equivalently the square root of the second moment of inertia in the given direction about the center of mass. With this definition, blur has units of distance. Herein each element of a pixel weight template is considered to occupy a point, rather than a finite extended region. This choice is made for simplicity and can be made in a variety of other ways, for example by defining a template element to be of uniform density over a square or circular region.

Alternatively, in some embodiments blur is defined as a combination of the calculated blur of the pixel weight template and a value, called herein system blur, that models the effect of image formation blur. In some embodiments according to this alternative, pixel weight template elements occupy points and their blur and the system blur are combined using the square root of the sum of the squares, which is generally considered the proper way to combine standard deviations.

Other methods can also be used to define blur. For example, a pixel weight template with positive weights can be used as a low pass filter. Blur can be defined as the cutoff wavelength (conventionally the wavelength of 3 dB attenuation) in a given direction (e.g. signal or projection direction), and is also in units of distance.

The use of a repeating sequence of pixel weight templates, selected in response to the orientation of a projection line, can allow blur in the projection direction to be selected to suit a given application. In some embodiments the selection is subject to constraints imposed by the geometry of the pixel grid, so that the actual projection direction blur can vary somewhat among the templates from the intended value. Blur in the projection direction can reduce uncorrelated noise in the digital image. In applications such as barcode reading, locating leads, and many others, if the direction of the bars, leads, or other relevant image features is substantially parallel to the projection direction then blur in that direction is almost entirely beneficial in terms of signal quality.

In the example illustrated in FIG. 3, blur in the projection direction has been selected to be approximately 2.3 pixels. There is some variation, however, as described above. For second template 311, third template 312, fourth template 313, fifth template 314, seventh template 316, and eighth template 317, the projection direction blur is within ±0.02 of the 2.3 pixel target. For first template 310 and sixth template 315, the projection direction blur is around 2.0 pixels.

Herein the term resolution is often used to describe the ability of a method for 1D signal extraction to resolve fine features, e.g. to reproduce with reasonable fidelity features of small size in the signal direction, for example individual bars and spaces in a barcode, thin traces on a circuit board, or narrow leads on a lead frame. Resolution can be limited by projection bin spacing (often called the sampling period in digital signal theory), blur in the signal direction, and external factors such as image formation blur. Reducing bin spacing, for example, may not improve resolution beyond limits imposed by signal direction blur. Likewise, reducing signal direction blur may not improve resolution beyond limits imposed by the bin spacing, and neither reduction may improve resolution beyond limits imposed by image formation blur.

The use of a repeating sequence of pixel weight templates, selected in response to the orientation of a projection line, can allow projection bin spacing and blur in the signal direction to be selected to suit a given application. In some embodiments the selection is subject to constraints imposed by the geometry of the pixel grid, so that the actual signal direction blur can vary somewhat among the templates from the intended value.

Signal direction blur can reduce noise in the same way that projection direction blur does, so that it is usually desirable to select a signal direction blur that is not smaller than necessary to achieve a desired resolution. Given this tradeoff and the way in which bin spacing and blur both limit resolution, in some embodiments signal direction blur and bin spacing are selected in a co-dependent manner. In one such embodiment, bin spacing is selected as a function of the orientation of the projection line, as further described below. Signal direction blur is then selected as a predetermined fraction of the bin spacing, with the understanding that the actual blur can vary somewhat as described above.

In some embodiments, bin spacing is selected as a function of the orientation of the projection line and also of the system blur, with signal direction blur then selected as a predetermined fraction of the bin spacing. With this embodiment, the bin spacing and signal direction blur can be selected as appropriate for the blur introduced by external factors as modeled by system blur.

In embodiments corresponding to FIG. 3, blur in the signal direction has been selected to be about 0.34 of the spacing between projection bins, which for the illustrated orientation of the projection line is a constant 0.73 pixels, making the signal direction blur around 0.25 pixels.

Blur and bin spacing can be used to analyze the resolution and noise reduction properties of a method or apparatus that extracts a 1D signal from a 2D image, for any method or apparatus wherein projection bins are responsive to some linear combination of pixels, including the trivial case where projection bins are responsive to one pixel. Such methods include the prior art methods of Bresenham line following; linear convolution; nearest-neighbor projection; skewed projection; bi-linear interpolation; bi-cubic interpolation; and others.

Bresenham line following generally introduces no blur beyond that caused by external factors. Therefore there is no significant noise reduction, and resolution is mostly limited by bin spacing, which is constrained by pixel grid geometry to the spacings that result from horizontal, vertical, or diagonal steps.

Linear convolution and skewed projection generally reduce noise by allowing blur in the projection direction. There is usually little blur in the signal direction, and resolution is generally limited by bin spacing, which is constrained by pixel grid geometry to the spacings that result from horizontal, vertical, or diagonal steps.

Nearest-neighbor projection, bi-linear interpolation, and bi-cubic interpolation generally reduce noise by allowing blur in the projection and signal directions. Resolution is generally limited by significant blur in the signal direction, which is determined by the interpolation formula and therefore not selected. These methods generally use a fixed, predetermined bin spacing, typically 1 pixel; smaller values are not generally beneficial due to signal direction blur. For example, for the method of bi-linear interpolation the signal direction blur is generally around 0.4 pixels for most orientations of the projection line, mostly independent of bin spacing.

Figure 4:
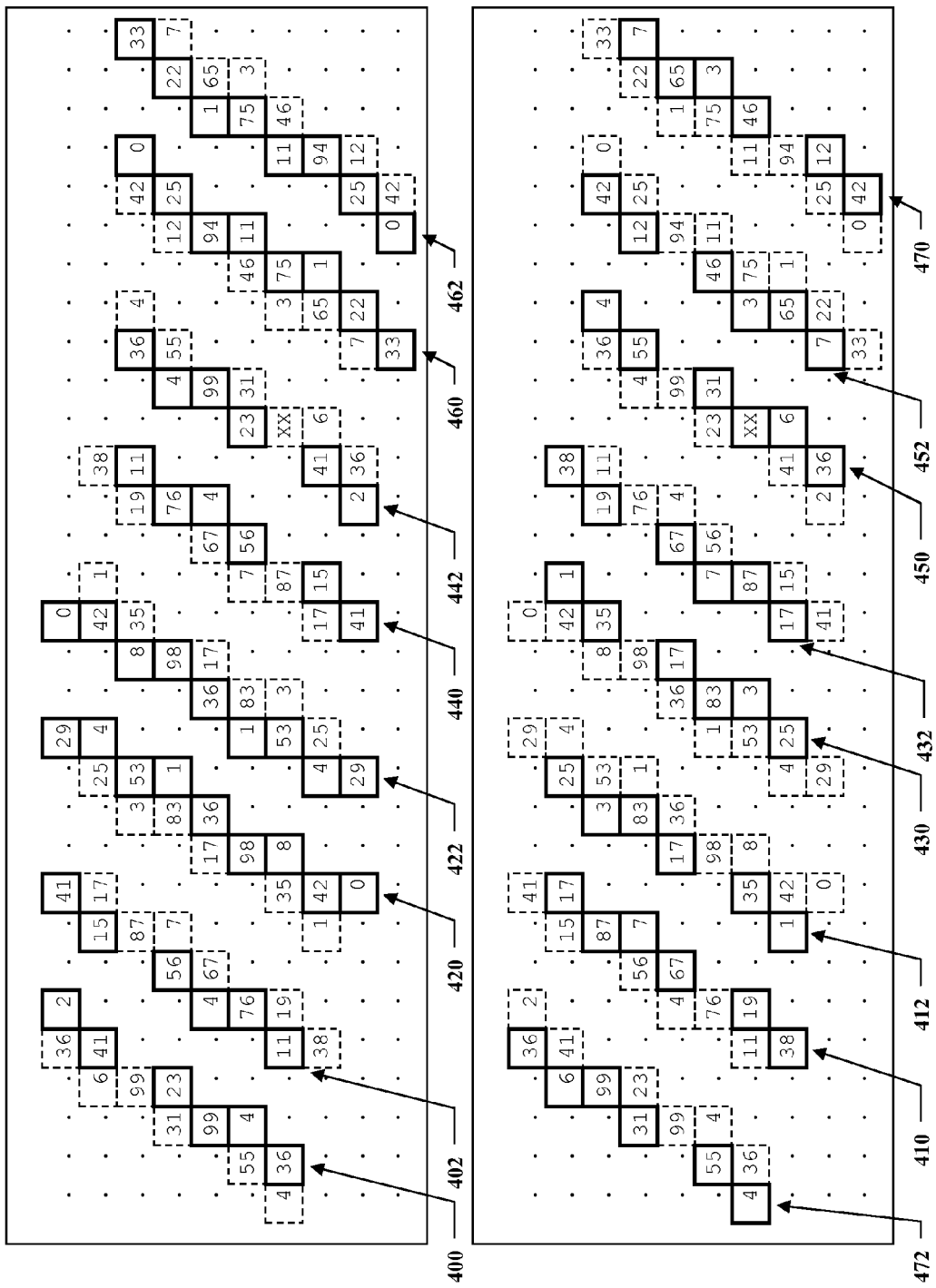
FIG. 4 is another illustration of the pixel weight templates of FIG. 3, which shows a property of the templates that is useful for various embodiments of a method or apparatus according to the invention.

FIG. 4 is another illustration of the pixel weight templates of FIG. 3, which shows a property of the templates that is useful for various embodiments of a method or apparatus according to the invention. As discussed above, when placed at their proper relative positions the pixel weight templates of FIG. 3 overlap, which means that an element of a given template can fall on the same pixel position in a digital image as an element of other templates in the repeating sequence. Conversely, a given pixel of a digital image can be used by multiple templates, and therefore influence multiple projection bins.

FIG. 4 illustrates the overlap for the particular templates of FIG. 3, which are selected in various embodiments for the illustrated orientation of the projection line. Elements 400 (shown in bold outline) of first pixel weight template 310 overlap elements 402 of second pixel weight template 311; elements 410 of second pixel weight template 311 overlap elements 412 of third pixel weight template 312; elements 420 of third pixel weight template 312 overlap elements 422 of fourth pixel weight template 313; elements 430 of fourth pixel weight template 313 overlap elements 432 of fifth pixel weight template 314; elements 440 of fifth pixel weight template 314 overlap elements 442 of sixth pixel weight template 315; elements 450 of sixth pixel weight template 315 overlap elements 452 of seventh pixel weight template 316; elements 460 of seventh pixel weight template 316 overlap elements 462 of eighth pixel weight template 317; and elements 470 of eighth pixel weight template 317 overlap elements 472 of first pixel weight template 310.

In can be seen that each template element in embodiments corresponding to FIG. 3 overlaps with one element of an adjacent template, which means that pixels of the digital image that influence the 1D signal influence two adjacent projection bins. In some embodiments, such as those corresponding to FIG. 3, for a majority of the allowable orientations of the projection line, pixels of the digital image that influence the 1D signal influence two adjacent projection bins. This property can lead to various desirable attributes, including flexibility in selecting properties of the templates such as the zeroth, first, and second moments. Prior art methods such as Bresenham line following, linear convolution, and skewed projection, where pixels that influence the 1D signal influence only one projection bin, offer less flexibility.

In some embodiments according to the invention, pixels of the digital image that influence the 1D signal influence two adjacent projection bins. The pixel weight templates of FIG. 3, for example, can be used with such embodiments. These embodiments can provide simplicity and high speed of operation, as will be further explained below. For prior art methods such as nearest-neighbor projection, bi-linear interpolation, and bi-cubic interpolation, pixels that influence the 1D signal can influence one, two, three, or more projection bins, leading to greater complexity and lower speed. For example, with bi-linear interpolation and a bin spacing of one pixel, pixels that influence the 1D signal will influence one, two, or three projection bins. If the bin spacing is made smaller, pixels of the digital image can influence four projection bins.

Embodiments of a method or apparatus according to the invention where pixels influence two adjacent projection bins can offer a good engineering tradeoff for a majority of orientations of the projection line, compared to many prior art methods. Good flexibility in selecting the properties of the pixel weight templates can be achieved, while simultaneously allowing simplicity and high speed of operation. In these embodiments, other strategies may be favorable for a minority of orientations, as will be further described below, for example in relation to FIG. 6.

The eight pixel weight templates of FIGS. 3 and 4 can be generated from eight slices, where a slice comprises information about the processing of mutually exclusive sets of pixels. For embodiments corresponding to FIG. 4, elements 400 and 402 comprise slice 0, elements 410 and 412 comprise slice 1, elements 420 and 422 comprise slice 2, elements 430 and 432 comprise slice 3, elements 440 and 442 comprise slice 4, elements 450 and 452 comprise slice 5, elements 460 and 462 comprise slice 6, and elements 470 and 472 comprise slice 7.

Slices can be used as an alternative way of defining a repeating sequence of pixel weight templates. A pixel weight template generally defines how one projection bin is computed, but does not define how a particular pixel is used, because that pixel can be used by multiple templates. A slice, by contrast, generally defines how a set of pixels are used, but does not define how a particular projection bin is computed because that bin is influenced by multiple slices. Either way the same 1D signal is produced; defining a repeating sequence of pixel weight templates using slices allows the computation to be carried out in an order and by an apparatus that can have favorable properties, including simplicity and speed, as will be further described herein.

Figure 5:
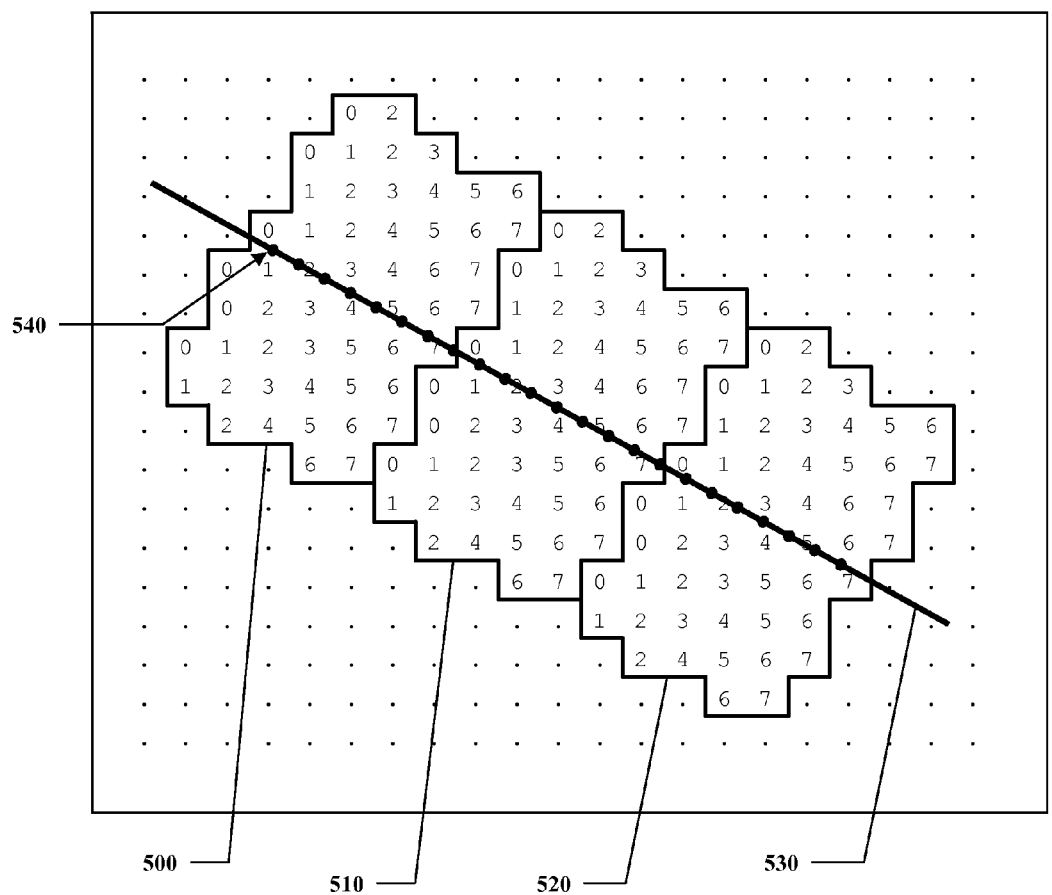
FIG. 5 shows slices for three repetitions of the pixel weight templates of FIGS. 3 and 4.

FIG. 5 shows slices for three repetitions of the pixel weight templates of FIGS. 3 and 4. Shown are first repetition 500, second repetition 510, and third repetition 520. The numbers on the grid in this figure identify the slice. FIG. 5 also illustrates how the repetitions fit together to form a repeating sequence of arbitrary length. Here the slices repeat with a period of eight, and a sequence of 24 slices can be generated from the three repetitions shown.

Since in the example of FIG. 5 two consecutive slices are used to generate each pixel weight template, the 24 slices shown can generate 23 pixel weight templates. For example, slice 7 of first repetition 500 and slices 0-7 of second repetition 510 are used to generate one complete repetition of the pixel weight templates of FIGS. 3 and 4. The pixel weight templates in this example also have a repeat period of eight.

The length of a sequence of projection bins generated from the repeating sequence of pixel weight templates need not be a whole number of repetitions. Various embodiments of apparatus described herein can generate a sequence of arbitrary length, regardless of the repetition period.

In FIG. 5 the slope of projection line 530, which is three pixels down per five pixels to the right, can more easily be seen. This is because the slices do not overlap, and so they can be illustrated without the extra horizontal separation used in FIGS. 3 and 4.

FIG. 5 further illustrates the sequence of centers of mass 540 corresponding to the 23 pixel weight templates generated by the illustrated slices and using the weights of FIGS. 3 and 4. Centers of mass 540 are evenly spaced along projection line 530 as previously described, and it can be seen here that this property holds across repetition boundaries.

The complete set of pixel weight templates, or equivalently slices, that comprises a repeating sequence for a given orientation, and optionally, additional data, all or in part used with the templates in a given embodiment, is called herein a module.

As described above, selecting pixel weight templates so that pixels of the digital image influence two projection bins can be a good engineering tradeoff for a majority of orientations of the projection line. Due to the geometry of a pixel grid, however, for some minority of orientations other selections can be favorable. This can be particularly true for orientations that are close to the parallel and diagonal orientations of a grid. The subset of allowable orientations of a projection line that include or are close to parallel is called the parallel zone. The subset of allowable orientations of a projection line that include or are close to diagonal is called the diagonal zone. Orientations that are not in the parallel or diagonal zones are in the normal zone. The union of the parallel and diagonal zones is called the degenerate zone.

As described above, the blur of a pixel weight template in the signal direction can limit the resolution of a 1D signal extraction method. Blur in the signal direction can be defined, for example, as the weighted standard deviation of position in that direction. Although the pixels and the weights that make up a pixel weight template can be selected, the pixel grid itself defines the position of those pixels in the signal direction. For a majority of orientations, the signal direction coordinates of pixels near a projection line are distributed in a fairly uniform manner, allowing flexibility in selecting the signal direction blur. For orientations in parallel and diagonal zones, however, those signal direction coordinates are non-uniformly distributed—they bunch up around rows, columns, or diagonals of the grid, with empty spaces in between. Since blur can be more strongly influenced by position than by weight, it can be favorable to follow a different strategy for selecting pixel weight templates for orientations in the parallel and/or diagonal zones.

In some embodiments, for orientations in the parallel zone, pixel weight templates are selected so that pixels of the digital image influence one projection bin. FIG. 6 illustrates a projection line 610 in the parallel zone, of orientation whose slope is one pixel down per nine pixels to the right. Repeating sequence of pixel weight templates 600 is shown, where each template is one column. There are nine such templates. As in the example of FIG. 3, the weights are selected so that the templates have substantially the same total weight, and so that the centers of mass are evenly spaced along projection line 610. Note that since pixels influence one projection bin, the templates do not overlap.

In some embodiments, for orientations in the diagonal zone, pixel weight templates are selected so that pixels of the digital image influence one projection bin. FIG. 6 illustrates a projection line 630 in the diagonal zone, of orientation whose slope is seven pixels down per eight pixels to the right. Repeating sequence of pixel weight templates 620 is shown, where each template lies within one diagonally-oriented rectangle. There are 15 such templates. As in the example of FIG. 3, the weights are selected so that the templates have substantially the same total weight, and so that the centers of mass are evenly spaced along projection line 630. Note that since pixels influence one projection bin, the templates do not overlap.

The selection of how many pixels influence a projection bin is only one example of following a different strategy in the parallel and/or diagonal zone. Another example is the selection of bin spacing, which is further described in conjunction with FIGS. 7 and 16.

The extent of the parallel and diagonal zones is a design choice that can depend on a number of factors, including, for example, desired resolution, desired noise reduction, and desired blur in the projection direction. In some embodiments, for example where high resolution is less important and/or where greater noise reduction is desired, either or both zones can be smaller or even empty. Furthermore, the point of transition from the fairly uniform distribution of signal direction positions characteristic of the normal zone, to the non-uniform distribution characteristic of the degenerate zone, depends on the extent of the pixel weight templates in the projection direction. The greater that extent, the smaller the degenerate zones will be. The extent of the pixel weight templates in the projection direction is largely dependent on the desired amount of noise reduction by blurring in the projection direction.

Figure 18:
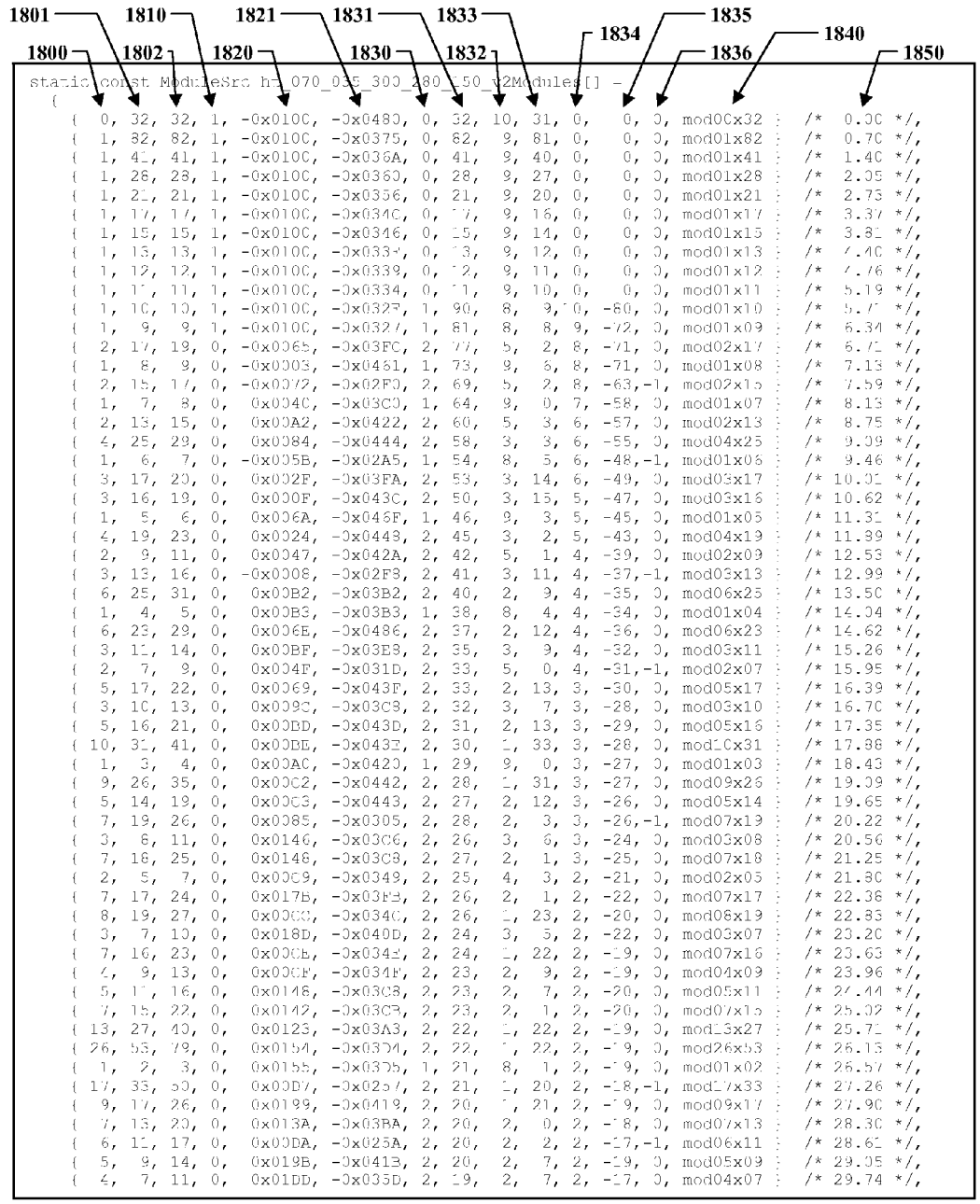

One example of these design choices is illustrated in FIGS. 18, 19, and 20, which will be more completely described below. Those figures show a set of 171 allowable orientations in the range 0-90 degrees for an embodiment where the desired blur in the projection direction is about 2.3 pixels and the desired blur in the signal direction is about 34% of the bin spacing. Each row of the data gives information about one particular orientation, which is indicated in degrees in angle column 1850. Zone column 1810 contains a "0" for orientations in the normal zone and a "1" for orientations in the degenerate zone. The parallel zone includes orientations in the range 0-6.34 degrees and 83.66-90 degrees, comprising 24 of the 171 allowable orientations. The diagonal zone includes orientations in the range 41.19-48.81 degrees, comprising 15 orientations. The normal zone comprises 132 orientations, a majority of about 77% of the total. Herein majority means greater than 50%.

Figure 7:
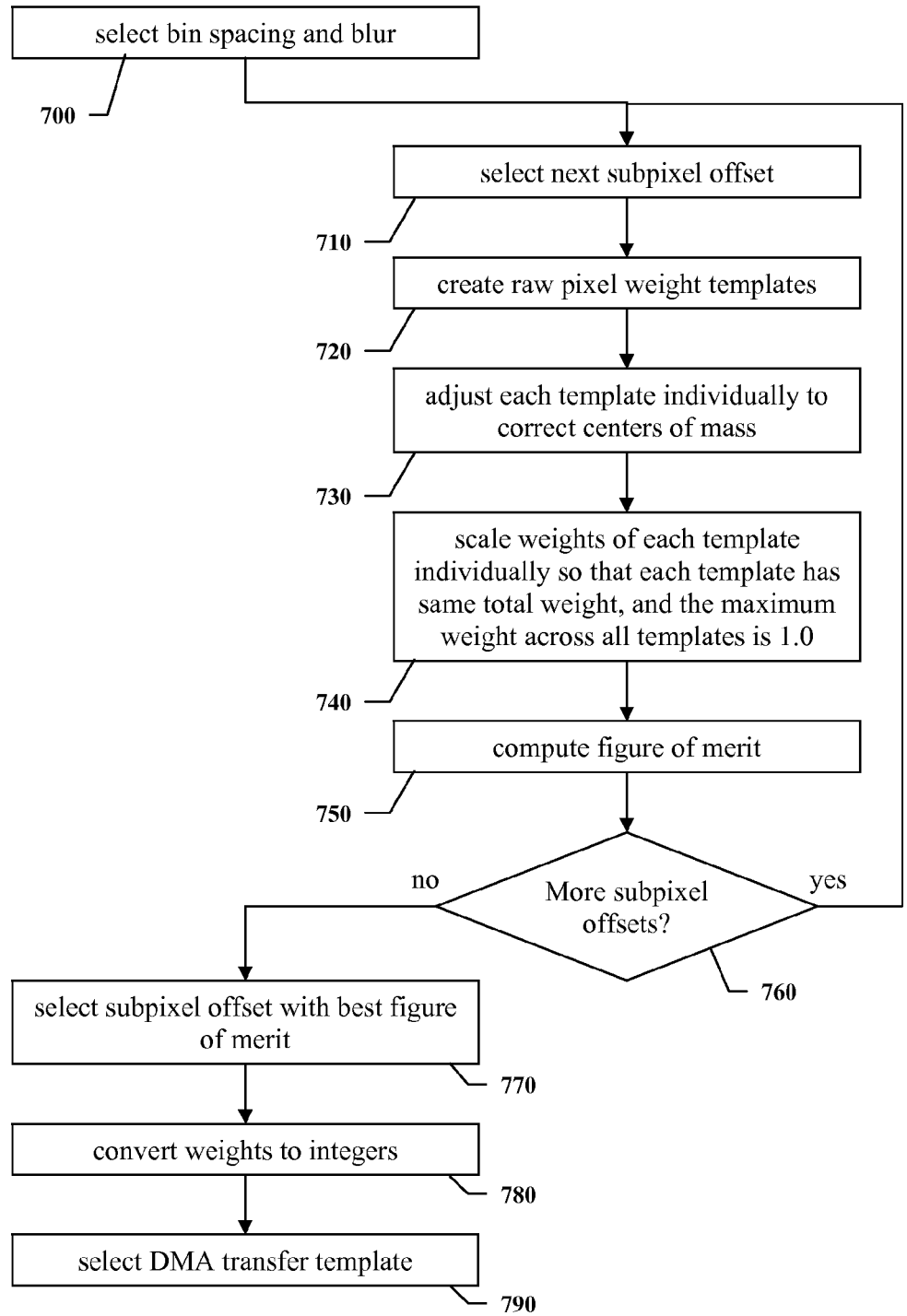
FIG. 7 is an illustrative embodiment of a method according to the invention for selecting pixel weight templates for a given orientation of a projection line.

FIG. 7 is an illustrative embodiment of a method according to the invention for selecting pixel weight templates for a given orientation of a projection line. The method of FIG. 7 can be applied after information describing a particular projection line is received. Alternatively, the method of FIG. 7 can be applied to some or all orientations in a set of allowable orientations, with the results stored in a memory and subsequently retrieved for use once information describing a particular projection line is received. The method of FIG. 7 was used to obtain the pixel weight templates in the examples of FIGS. 3, 4, and 6.

In the illustrative method of FIG. 7 the allowable orientations have rational slope, meaning that the slope is the ratio of an integer N to an integer D. N and D are usually relatively prime, but need not be as will be described below. D may be 0, signifying infinite slope. If N and D are both non-negative, slopes in the range 0-90 degrees can be specified. If one of N and D is non-negative and the other is allowed any integral value, slopes in the range 0-180 degrees can be specified, which covers the full range of orientation that is possible in the plane.

The set of allowable orientations can be restricted to a particular subset of orientations of rational slope, such as the 171 orientations of FIGS. 18, 19, and 20. In FIGS. 18, 19, and 20, numerator column 1800 contains N, and denominator column 1801 contains D. Selecting the set of allowable orientations is further described below. If we replicate all orientations but 0° and 90°, and negate D in the replicas, we get 340 allowable orientations covering the full 0-180° range.

Referring back to FIG. 2, example projection line 220 has rational slope and is a member of the set of allowable orientations. Requested projection line 250 may or may not be of rational slope and may or may not be a member of the set of allowable orientations, in part because whatever process provides requested projection line 250 may be unaware of the existence or details of the set of allowable orientations. In the example of FIG. 2 it is not a member, and so requested projection line 250 is rotated slightly, for example about its center, to obtain example projection line 220.

In the method of FIG. 7, a repeating sequence of P pixel weight templates is selected. Since there are P templates, the repetition period is P. Each template of the sequence is placed N pixels in x (e.g. to the right) and D pixels in y (e.g. down) from the same template in the previous repetition, so that the templates follow the slope of the projection line. In the example of FIGS. 3-5, N=3, D=5, and P=8. For pixel weight templates 600 of FIG. 6, N=1, D=9, and P=9. For pixel weight templates 620 of FIG. 6, N=7, D=8, and P=15.

With continuing reference to FIG. 7, step 700 selects a bin spacing and blur that is appropriate for a given slope N/D according to various criteria determined by the needs of a given application, primarily resolution and noise reduction. Since each template generates one projection bin, and since the templates move (N, D) pixel coordinates in P bins, the bin spacing B in pixels is $$B = \frac{\sqrt{N^2 + D^2}}{P} \tag{1}$$

Note that herein we are assuming square pixels. Equivalent formulas for other geometries, such as square, parallelogram, or hexagonal pixels, are easily derived. Furthermore, we are assuming that the projection direction is perpendicular to the signal direction. Equivalent formulas for non-perpendicular directions are also easily derived.

Using equation 1, step 700 can select the bin spacing B by selecting P. The selections are limited to integral values of P, but any bin spacing can be approximated to arbitrary precision by multiplying N and D by an integer, which preserves the slope of the projection line while allowing more precision in the selection of bin spacing. In some embodiments where high resolution is desired, and for example the embodiments of FIGS. 3, 4, 6, 18, 19, and 20, P=max(|N|, |D|) for orientations in the parallel zone and P=|D|+|N| for all others. In some embodiments where somewhat less resolution is desired, P=max(|N|, |D|) for orientations in the parallel zone and P=max(|N|, |D|)+min(|N|, |D|)/2 for all others, where D and N are multiplied by 2 if necessary to make P an integer. In some embodiments where even less resolution is desired, P=max(|N|, |D|) for all orientations. Further explanation of these particular selections for bin spacing is given below in relation to FIG. 16. These bin spacing selections are another example of following a different strategy in the parallel and/or diagonal zone.

Step 700 also selects a target signal direction blur $\sigma_u$ and projection direction blur $\sigma_v$. Note that the actual blur values of the pixel weight templates will generally be somewhat different, as will be further explained below. In some embodiments, either or both of signal direction blur $\sigma_u$ and projection direction blur $\sigma_v$ can be predetermined and therefore not selected in step 700.

Larger values of target projection direction blur $\sigma_v$ provide greater noise reduction, but if image features, such as bars of a barcode, are not substantially parallel to the projection direction then larger values of $\sigma_v$ can degrade the quality of the 1D signal. Thus the appropriate value to use is application-dependent. In the embodiments of FIGS. 3, 4, 6, 18, 19, and 20, $\sigma_v$=3.0 pixels.

Target signal direction blur $\sigma_u$ can be selected to be proportional to the bin spacing, and so varies with the orientation of the projection line. In some embodiments where high resolution is desired, and for example the embodiments of FIGS. 3, 4, 6, 18, 19, and 20, $\sigma_u$ is 35% of the bin spacing in the normal zone and 70% of the bin spacing in the degenerate zone, which is yet another example of following a different strategy in the parallel and/or diagonal zone. In other embodiments where less resolution is desired, $\sigma_u$ can be 50% of the bin spacing in all zones.

For square pixels and perpendicular projection direction the mapping between (x, y) pixel coordinates and (u, v) signal-projection coordinates is $$\begin{pmatrix} u \\ v \end{pmatrix} = \frac{1}{\sqrt{N^2+D^2}} \begin{pmatrix} D & N \\ -N & D \end{pmatrix} \begin{pmatrix} x-x_0 \\ y-y_0 \end{pmatrix} = \frac{1}{BP} \begin{pmatrix} D & N \\ -N & D \end{pmatrix} \begin{pmatrix} x-x_0 \\ y-y_0 \end{pmatrix} \quad (2)$$

where $(x_0, y_0)$ is a subpixel offset in the range $0 \le x_0, y_0 < 1$. Steps 710, 720, 730, 740, 750, and 760 represent a loop over a set of subpixel offsets whose purpose is to select the best subpixel offset according to a figure of merit to be described below. In an illustrative embodiment, the subpixel offsets comprise a first 8×8 grid with a spacing of ⅛ pixel. In another illustrative embodiment, a second 8×8 grid is added with a spacing of 1/64 pixel and centered on a subpixel offset from the first grid that received the highest figure of merit. In yet another embodiment, a single fixed subpixel offset is used, and so steps 720, 730, 740 are performed once, and steps 710, 750, 760, and 770 are not needed.

In step 720, raw pixel weight templates can be created as follows. First, P slices are created, numbered 0-P-1. Every pixel on a conceptually unbounded grid such that $|v| \le v_{max}$ and $0 \le u/B < P$ becomes an element of slice $\lfloor u/B \rfloor$. Here $v_{max}$ is a parameter, for example $1.5\sigma_v$. The P slices define the elements of the P pixel weight templates, as described above. In an illustrative embodiment, for orientations in the normal zone two adjacent slices modulo P define a template, and in the degenerate zone each slice defines a template.

Next, for each template a weight is assigned to each element that is a part of that template, by assigning weights to the slices that define the templates. For orientations in the normal zone, this means that two weights will be assigned to each element of each slice, corresponding to the two templates that are influenced by the slice. In the degenerate zone, one weight is assigned to each element of each slice.

A variety of methods can be used to assign the weights to the templates consistent with the teachings of FIG. 7. In an illustrative embodiment, floating point weights are assigned according to an elliptical Gaussian $$w = w_{bal} e^{-\frac{1}{2}\left[\left(\frac{u-u_0}{\sigma_u}\right)^2 + \left(\frac{v-v_0}{\sigma_v}\right)^2\right]} \quad (3)$$

where (u, v) are the signal-projection coordinates of the template element, $w_{bal}$ is 1.0 in step 720 and will be adjusted in step 740, and $(u_0, v_0)$ are the coordinates of the origin of the template. In step 720 the origin $(u_0, v_0)$ is set to the geometric center of the template, and will be adjusted in step 730. For a template in the normal zone made from slices s and s+1 (modulo P), the geometric center is at (s+1, 0). For a template in the degenerate zone made from slice s, the geometric center is at (s+0.5, 0).

In step 730, the weights of each template are adjusted so that the centers of mass are evenly spaced along a straight line of slope N/D. For a continuous unbounded elliptical Gaussian according to equation 3, the center of mass is at $(u_0, v_0)$ and so if the templates were continuous and unbounded, the centers of mass would already be evenly spaced along a straight line of slope N/D. However, since the weights lie on a discrete, irregularly-bounded grid (e.g. as in FIG. 3), the centers of mass will not in general be so favorably located.

There are many methods that can be used to adjust the weights of the templates within the scope of step 730. Since it can be desirable to make relatively small adjustments, some embodiments compute the average offset of the centers of mass of the templates from their geometric centers. Since the geometric centers are evenly spaced along a line of slope N/D, points at any fixed offset from those geometric centers will also be. The average offset of the centers of mass from the geometric centers is a fixed offset, and is the smallest overall movement of the centers of mass that would place them evenly spaced along a line of the desired slope. Thus a target position for each template's center of mass can be established that allows the least overall movement.

Once target positions are established, the movement vector for the center of mass of each template is known. In an illustrative embodiment, weight is added preferentially to one side of each template so as to move the center of mass in the desired direction and by the desired amount. In another illustrative embodiment corresponding to the examples of FIGS. 3, 4, 6, 18, 19, and 20, the origin $(u_0, v_0)$ is adjusted individually for each template so that the centers of mass are moved to the target positions. This embodiment requires solving two simultaneous non-linear equations in two unknowns (coordinates of the center of mass as a function of the coordinates of the origin), which can be done using the well-known Newton-Raphson method.

For the normal zone where templates are generated from two slices and the u coordinates are fairly evenly distributed, the system of equations is usually well-conditioned and so Newton-Raphson converges rapidly to a sensible solution. For the degenerate zone, the system of equations can be ill-conditioned or degenerate. Thus in the parallel zone the movement is constrained to be in the parallel direction (x or y) closest to the projection direction, and in the diagonal zone the motion is constrained to be in the diagonal direction closest to the projection direction, resulting in a well-conditioned one degree of freedom problem that can be solved using Newton's method. This method of handling the degenerate zone is preferably used with the zone selection method described below.

In an alternate embodiment of steps 720 and 730, an elliptical parabola is used instead of an elliptical Gaussian. Any suitable function of position can be used within the scope of FIG. 7. Some embodiments described herein or contemplated by those of ordinary skill may rely on functions having certain properties, for example being continuous.

The above-described methods for adjusting the centers of mass are illustrative, and many others can be devised that provide a more even spacing of the centers of mass than was obtained in step 720. The use of a target position allowing the least overall movement can be desirable but is not required. Newton-Raphson can provide a very accurate result, but if speed is more important than accuracy then simpler estimates can be used. In embodiments where weight is preferentially added to one side, the weight to be added and the positions at which to add them can be calculated to varying degrees of precision depending on the time available to do the calculations.

Step 740 scales the weights by adjusting $w_{bal}$ individually for each template so that each template has the same total weight and so that the maximum element weight across all templates is some desired value, for example 1.0. Since $w_{bal}$ has no effect on either the center of mass or the blur of a template, it can be adjusted freely without upsetting all of the work that was done to get the desired centers of mass and blur.

For a continuous unbounded elliptical Gaussian according to equation 3, the signal direction blur is $\sigma_u$ and the projection direction blur is $\sigma_v$. However, since the weights lie on a discrete, irregularly-bounded grid the actual blur will in general be somewhat different. For $\sigma_v=3.0$ and $v_{max}=4.5$, for example, the calculated projection direction blur is generally in the range 2.1-2.4. For $\sigma_u=0.35B$ in the normal zone, the calculated signal direction blur is generally in the range 0.33B-0.38B. For $\sigma_u=0.70B$ in the degenerate zone, the calculated signal direction blur is generally in the range 0 (at the parallel and diagonal orientations) to 0.23B. If the degenerate zone were handled in the same way as the normal zone, the signal direction blur would be much higher, up to 0.5B. Note that when the calculated blur is very low, as in the degenerate zone, resolution will generally be limited by external factors and it is generally more realistic to include system blur as described above.

Figure 16:
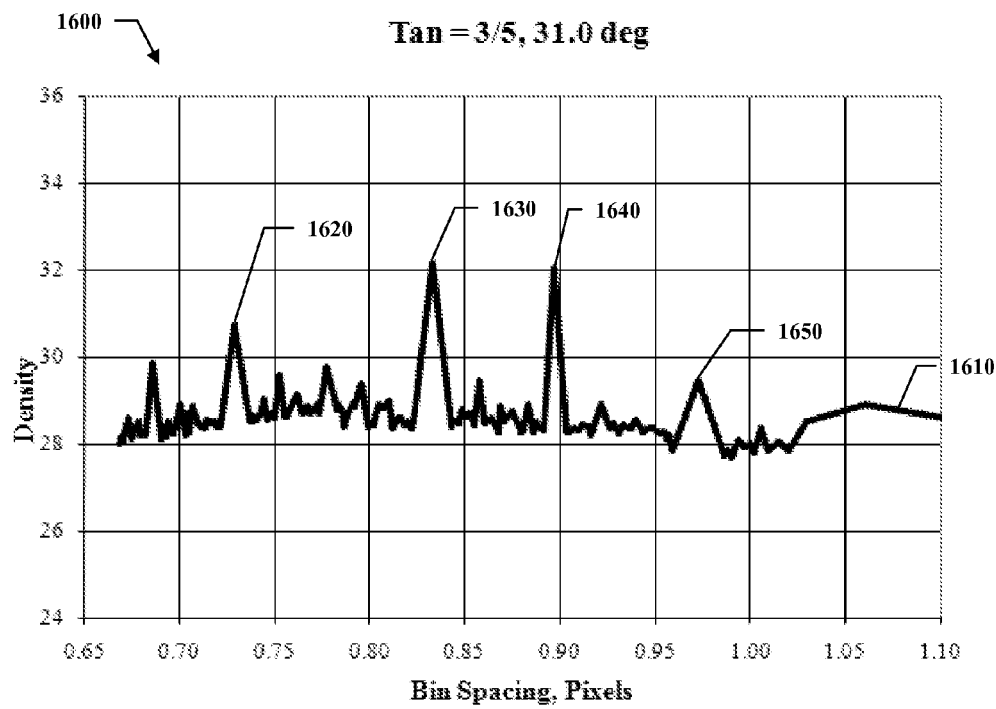
FIG. 16 shows a plot of the density figure of merit as a function of bin spacing for an orientation of slope 3/5.

Step 750 computes a figure of merit for the module (the complete set of templates) that can be used in step 770 to select the best subpixel offset, and also for other purposes, for example as used in FIG. 16. Since after the adjustments of step 740 each template has the same total weight $w_{tot}$, one can define the weight of a module to be $w_{tot}$. Since the weights are normalized so that the maximum element weight of a module is 1.0, it is reasonable to compare weights of different modules. Generally higher total weight provides greater noise reduction, so in some embodiments the figure of merit is $w_{tot}$.

In other embodiments, a figure of merit called density is used that combines noise reduction with resolution, taking into account system blur $a_{sys}$:

$$\text{density} = \frac{w_{tot}}{\sigma_{sys}^2 + \sigma_{u^*}^2} \quad (4)$$

where $\sigma_{u^*}$ is the maximum calculated signal direction blur over all of the templates in the module. A reasonable value for $\sigma_{sys}$ is 0.28 pixels, a blur that could model electro-optical pixels of 100% fill factor in a system with no motion blur and in perfect focus. Higher or lower values can be used to model different external conditions.

In some embodiments, the pixel weight templates use the floating point weights obtained so far. In other embodiments, step 780 converts the floating point values to integers for use in an apparatus that relies on integer arithmetic operations to compute the weighted sums. For step 780, it is desirable that the conversion to integer values preserves to reasonable precision the equality of total weight and the even spacing of centers of mass that has so far been obtained.

As noted above, scaling the weights of a template does not affect the center of mass or blur. Rounding off to integers will in general have a small but nonzero effect. In an illustrative embodiment, for each template of a module a scale factor is selected to apply before rounding that almost always results in the templates of a module having exactly the same total integer weight.

A target scale factor $w_1$ is selected that is just under a desired maximum integer weight. For example, if the integer weights are to fit in 8 bits, the desired maximum weight can be 255 and $w_1$ could be 254. Note that $w_1$ is a floating point value. For every element of a template, a provisional integer weight is computed by rounding the product of $w_1$ and the floating point weight previously computed. The provisional total integer weight for the template is the sum of the provisional integer weights.

For each floating point weight $w_f$ and corresponding provisional integer weight $w_i$, an upper and lower bound of target scale factor $w_1$ is computed such that any value of $w_1$ between the bounds would leave $w_i$ unchanged. The bounds are $(w_i \pm 0.5)/w_f$. For a given template, all of the lower and upper bounds for all of the template's elements are collected into an array and sorted in increasing numerical order. The array thus contains an even number of values, with the upper half $\geq w_1$ and the lower half $\leq w_1$.

The array can be viewed as points along the real number line, with gaps of varying size between the points. For any value of $w_1$ within a gap, the total integer weight of the template, which is the sum of the rounded products of $w_1$ and the floating point weights, is unchanged. As $w_1$ crosses a point in the array to the next gap, the total integer weight changes by 1. The central gap in the array, i.e. the gap between the top and bottom halves, corresponds to values of $w_1$ where the total integer weight equals the provisional total integer weight.

The exact point of transition from one gap to the next is somewhat indeterminate due to machine-dependent behavior of floating point operations. If two points in the array are identical or nearly identical to around machine precision, there may be no clear gap within which a specific total integer weight is achieved. Increasing or decreasing $w_1$ past a close pair will effectively change the total weight by 2, but these cases are relatively rare, in part due to the way that floating point weights are obtained, and in part because given the high precision of floating point numbers, even a tiny gap is sufficient.

With the above understanding, the description of an illustrative embodiment of step 780 can be completed. A target total integer weight for all templates of a given module is computed by rounding the product of $w_1$ and $w_{tot}$. The difference between the target total integer weight and the provisional total integer weight for a given template indicates how much the total integer weight must be changed to hit the target. Since the total integer weight changes by 1 (up or down) for each point in the array that is crossed, this difference can be used as an offset from the center of the array to find the gap corresponding to the target total integer weight.

Using the offset, the value of $w_1$ is changed to the midpoint between two neighboring values in the array. Using the new value of $w_1$, the final integer weights are computed for the template by rounding the products of $w_1$ and the floating point weights.

Since the final integer weights are computed by scaling and rounding, high accuracy in the centers of mass and blur is maintained. If the gap used to compute the new value of $w_1$ is substantially larger than machine precision, the total integer weight of a template will be exactly the target value. In some embodiments, the rare cases where the total integer weight differs from the target are simply ignored—the difference is not considered significant. In other embodiments, individual integer weights of a template that did not hit the target are adjusted up or down to correct the total weight. It is preferable that the weights to be so adjusted are ones closest to the round-off point.

In some embodiments, step 790 is performed to select a DMA (direct memory access) transfer template for the module, which can be used by various apparatus to obtain parameters that a DMA controller can use to obtain from memory the pixels used to produce the 1D signal for a given projection line. The selection of a transfer template and use of DMA for this purpose is further described below in relation to FIGS. 9, 13, 14, 15, 17, 18, 19, and 20.

In some embodiments, a variation on parts of step 720 is used to determine the zone (parallel, diagonal, or normal) for a module. From known values of N, D, $\sigma_v$, and $v_{max}$, and for a given value of subpixel offset $(x_0, y_0)$, all pixel positions that would become an element of a slice can be identified by following the above description of step 720. If there is a subpixel offset such that for each slice, all elements of the slice are entirely contained within one row or column of the pixel grid, then the module is in the parallel zone. If there is a subpixel offset such that for each slice, all elements of the slice are entirely contained within one diagonal of the pixel grid, then the module is in the diagonal zone. Otherwise, the module is in the normal zone.

In an alternate embodiment, steps 720, 730, and 740 are replaced with a method that selects pixel weight template based on interpolation, for example bi-linear interpolation. In this alternate embodiment, a pixel weight template is used to compute the sum of interpolated pixel values at points along a line in the projection direction. The interpolation formula is not applied to pixels of the digital image itself, as is normally done in prior art interpolation methods, but rather is used to compute the templates. The templates of a module obtained in this manner will generally have more complex patterns of overlap than described elsewhere herein, because as noted above, with for example bi-linear interpolation pixels can influence one, two, three, or even four projection bins.

In prior art interpolation methods, a fixed projection bin spacing is generally used at all orientations, for example 1 pixel. In order to produce a repeating sequence of pixel weight templates, however, the projection bin spacing must be a carefully selected function of orientation. Referring to equation 1, in order to make P an integer B must be selected from a particular set of generally irrational numbers as a function of N and D. Only at rare orientations, such as N=3, D=4, will a simple value of B, e.g. 1 pixel, result in a repeating sequence of templates. Thus for this alternate embodiment using interpolation to select pixel weight templates, bin spacing is selected as a function of orientation as described elsewhere herein.

Figure 8:
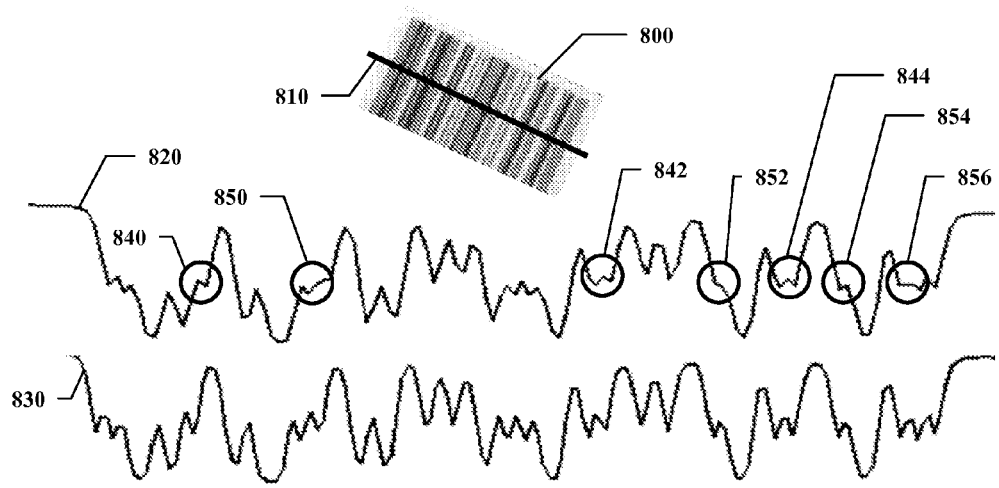
FIG. 8 illustrates the enhanced resolution that can be achieved with embodiments described herein, as compared with methods using bi-linear interpolation.

FIG. 8 illustrates the enhanced resolution that can be achieved with embodiments described herein, as compared with methods using bi-linear interpolation. From barcode 800, 1D signal 820 is extracted along projection line 810 using prior art bi-linear interpolation at a bin spacing of 1 pixel. 1D signal 830 is extracted along projection line 810 using embodiments herein described. Both methods have high photometric and geometric accuracy, but the signal direction blur of the embodiments described herein is substantially reduced, allowing smaller bin spacing and higher resolution.

For 1D signal 820 extracted by bi-linear interpolation, features 840, 842, and 844 are strongly attenuated. Features 850, 852, 854, and 856 are completely lost. These attenuated or lost features correspond to narrow bars and spaces of barcode 800, and the attenuation and/or loss can prevent barcode 800 from being decoded. While these features are somewhat attenuated in 1D signal 830, the attenuation is not so severe as to prevent barcode 800 from being decoded.

Figure 9:
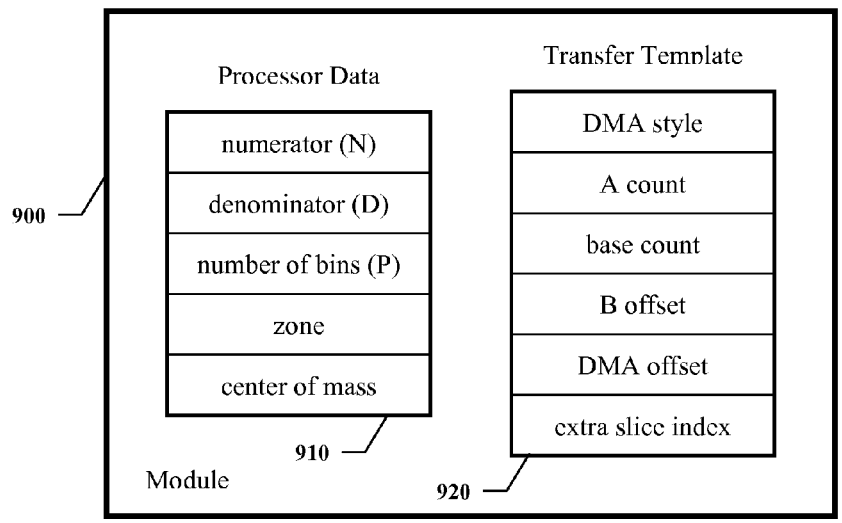
FIG. 9 illustrates a module data structure that can be used for various embodiments of an apparatus according to the invention.

FIG. 9 illustrates a module data structure 900 that can be used by various embodiments of an apparatus according to the invention. Processor data 910 comprises information used by a computational apparatus, such as microprocessor or programmable gate array, for computing a 1D signal using a repeating sequence of pixel weight templates. Included in processor data 910 is a description of the allowable orientation of a projection line corresponding to module 900, specified by a slope that is the ratio of integers N and D as described above. Also included is the number of pixel weight templates P of the module, which is the same as the number of projection bins produced by one repetition and also the period of the module. Information about the zone (parallel, diagonal, or normal) within which the orientation falls can be used, for example, to determine whether slices of the module influence one projection bin or two.

Information specifying the centers of mass of the templates can be useful. In embodiments where the P centers of mass are evenly spaced along a line of slope N/D to sufficient precision, the position of just one center of mass can be sufficient to specify all of them. The center of mass can be specified relative to an anchor pixel, which is one arbitrarily selected pixel in one arbitrarily selected template of a module, for example the first pixel of the first template.

Module data structure 900 can also include transfer template 920. This template provides the information needed to compute a set of DMA transfer parameters that can be used to obtain the pixels corresponding to particular projection line at the orientation of module 900, as will more completely be described below.

Figure 14:
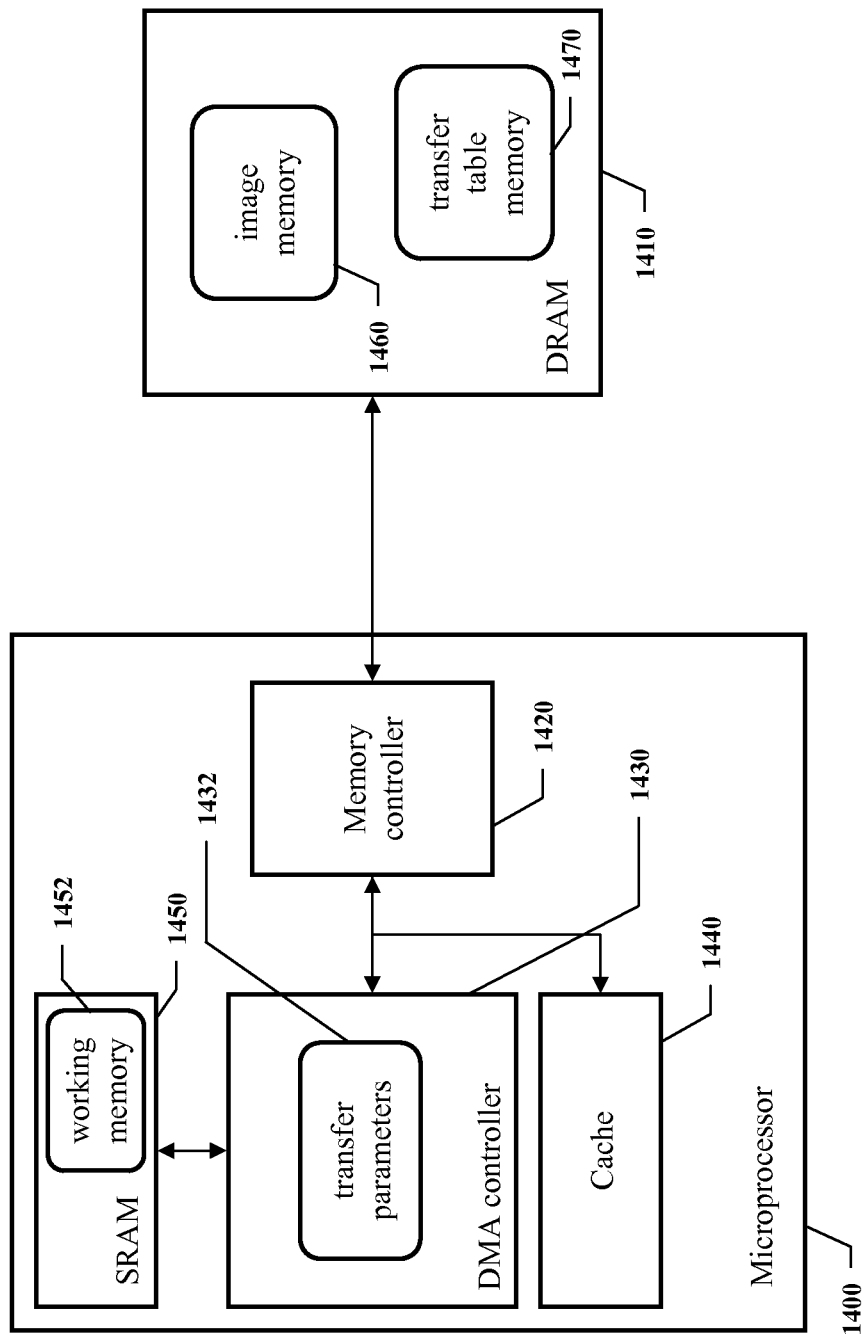
FIG. 14 illustrates an embodiment of an apparatus that can use transfer templates as described above in relation to FIG. 13.

In some embodiments module data structure 900 is implemented in software for a programmable device such as a microprocessor. The microprocessor may contain a DMA controller, such as illustrated in FIG. 14 and further described below. Module data structure 900 can be specified in a programming language, such as the well-known C language, as illustrated in FIG. 17 and further described below.

In some embodiments a module data structure 900 is computed for each or a portion of a set of allowable orientations and stored in a memory. An example is illustrated in FIGS. 18, 19, and 20. Numerator column 1800, denominator column 1801, bin count column 1802, zone column 1810, x center of mass column 1820, and y center of mass column 1821 hold processor data 910. DMA style column 1830, "A" count column 1831, base count column 1832, extra slice index column 1833, "B" offset column 1834, x origin column 1835, and y origin column 1835 hold transfer template 920.

Not shown in FIG. 9 are the actual pixel weight templates of module 900. Examples of data defining the templates are given below with regards to FIGS. 10 and 12.

FIG. 10 is a portion of a computer program in the C language that can be used in embodiments that comprise a microprocessor or other programmable computing device. In these embodiments, modules are generated from slices as described above. Slices comprise one or more control words 1000. Each control word 1000 defines the relative location of a pixel (pixelOffset), and the weights (binWeight0, binWeight1) for the two adjacent pixel weight templates that are generated from the slice.

The pixel offset is relative to an anchor pixel. The anchor pixel remains fixed for each complete repetition of a module, and then is updated for the next repetition. The pixel offset can be specified as an (x, y) offset. It can also be specified as in control word 1000 as an address offset, which combines the x and y components based on the pitch (row address difference) of the rows of pixels. In example control word 1000, 15 bits are allocated for the pixel offset, so that the entire control word 1000 is a convenient 32 bits. More or fewer bits can be allocated as needed in a given embodiment.

In the embodiment of FIG. 10, all of the control words of a module are stored in memory in consecutive elements of an array, starting with the control words of slice 0 and ending with those of slice P−1. Each control word 1000 contains a flag (nextBin) that indicates the end of one slice and the output of one projection bin.

To extract a 1D signal using the slices of a module, input variables 1010 are provided, for example by the caller of a subroutine or by any suitable means. As will be seen, some of these input variables 1010 are updated during the execution of inner loop 1030, and others are constant.

Input variable pixelAddress is a pointer to the anchor pixel of the current repetition of the module. Initially it specifies the anchor pixel of the first repetition, and is updated on each repetition. Input variable binAddress is a pointer to the next projection bin to be generated. Initially it specifies the first bin of the 1D signal, and is updated after each slice. Input variable count specifies the remaining number of control words in the 1D signal to be generated. Initially it specifies the total number of control words, which should correspond to a whole number of slices and which may or may not correspond to a whole number of repetitions. The initial value of count is computed based on the number of projection bins desired and the known number of control words in each slice, and counts down to 0 as inner loop 1030 executes.

Input variable controlAddress is a pointer to the first control word of a module; it is not updated. Input variable moduleSize specifies the number of control words in the module; it is not updated. Input variable moduleOffset specifies the pixel address offset from the anchor pixel of one repetition to the anchor pixel of the next repetition; it is not updated.

During the execution of inner loop 1030, loop variables 1020 are used. Loop variables bin0 and bin1 are a set of two registers that hold the current partial sums for the two projection bins influenced by the currently processing slice. They are initialized to zero as shown, and are linearly shifted during execution of inner loop 1030 as described below. Loop variable controlLoopCount holds a count of the number of control words of the module that have been processed for the current repetition. It is initialized to 0, incremented for each control word, and reset to 0 at the end of each repetition.

Inner loop 1030 executes once for each control word processed. The current control word is fetched, and using the pixel offset in the control word the current pixel is fetched. The bin partial sums in the set of two registers (bin0 and bin1) are then updated using the pixel and the two weights in the control word.

If the flag in the control word indicates the end of a slice, the set of two registers (bin0 and bin1) are linearly shifted. The next projection bin is generated from the value shifted out of bin0; bin1 is shifted into bin0; and a 0 value is shifted into bin1. The effect is that every projection bin is generated from two consecutive slices, which define one pixel weight template of the module.

The loop variable controlLoopCount is incremented, and if the value indicates the end of the module, which corresponds to the end of one complete repetition of the sequence of pixel weight templates, then pixelAddress is updated to point to the anchor pixel for the next repetition and controlLoopCount is reset to 0.

It should be noted that the first projection bin generated by inner loop 1030 is garbage because only one slice was used.

The program of FIG. 10 can be used for modules, for example those in the degenerate zone, where pixels or entire slices influence only one projection bin instead of two. In such cases, binWeight1 can be set to 0. Alternatively, a similar program but with only one weight per control word and a set of only one register can be used.

For embodiments where each pixel can influence more than two bins, for example N bins, control word 1000 can hold N weights, loop variables 1020 can include a set of N registers, and inner loop 1030 can update and linearly shift the set of N registers. Such modifications to the program can be made by one of ordinary skill.

Figure 11:
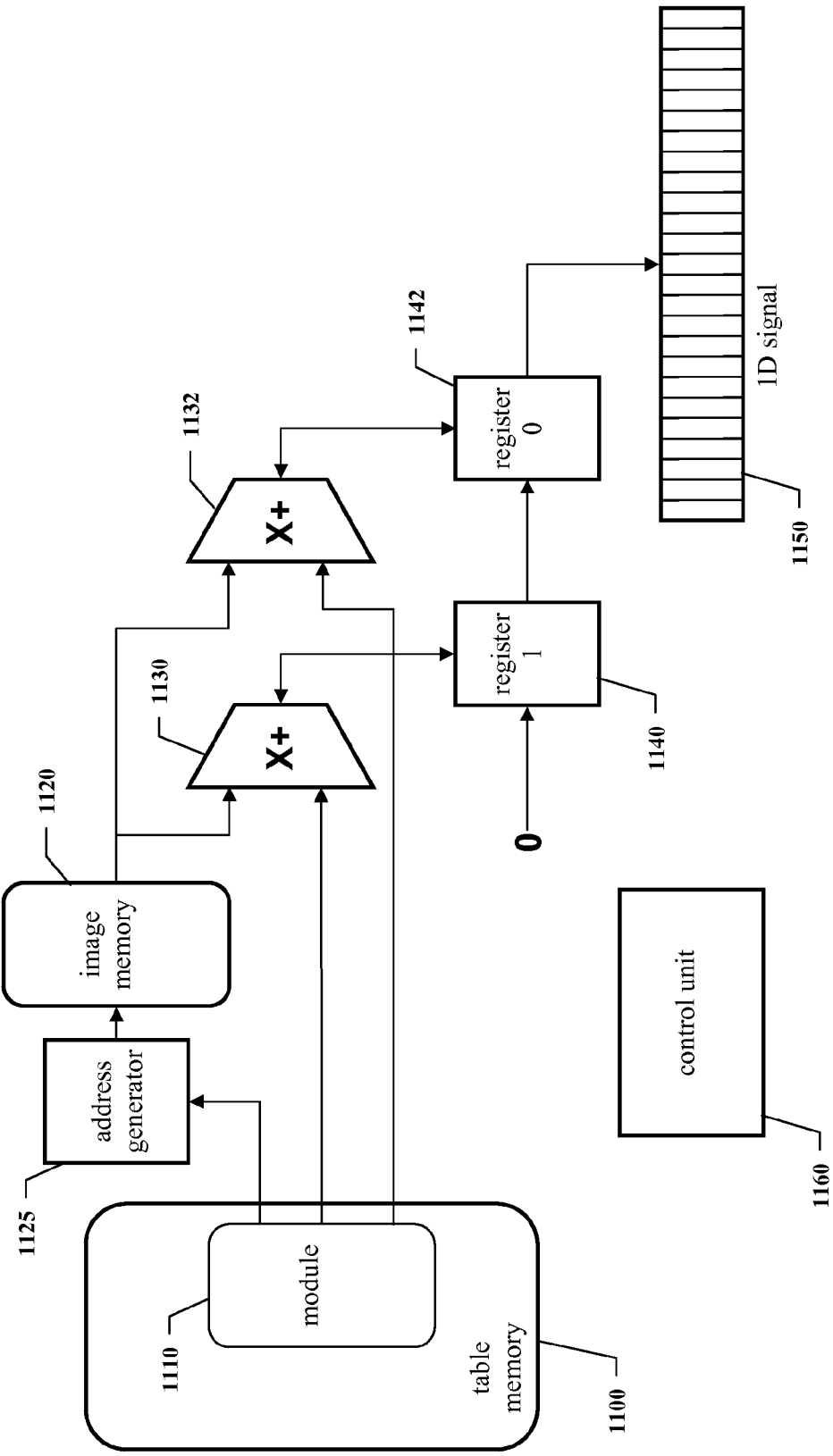
FIG. 11 illustrates an embodiment wherein the computational steps can be performed by a digital electronic device that does not primarily rely on software for its operation, for example a field-programmable gate array (FPGA).

FIG. 11 illustrates an embodiment wherein the computational steps can be performed by a digital electronic device that does not primarily rely on software for its operation, for example a field-programmable gate array (FPGA). A table memory 1100 holds a set of modules, including example module 1110, which correspond to a set of allowable orientations of projection lines, or a portion of such a set. Example module 1110 holds data that specifies a repeating sequence of pixel weight templates, where the information is in the form of slices as previously described.

Image memory 1120 holds a digital image or portion thereof. Pixel position data from example module 1110 is used by address generator 1125 to supply addresses to image memory 1120 so that the appropriate pixels can be fetched. Pixels are fed into first multiply-accumulator 1130 and second multiply-accumulator 1132, which multiplies the pixel values by weights read from example module 1110 and adds the products to register 0 1142 and register 1 1140.

Register 0 1142 and register 1 1140 comprise a set of two registers that can be linearly shifted as shown, with a 0 value being shifted into register 1 1140 and the value shifted out of register 0 1142 being written to a projection bin of 1D signal 1150. At the end of each slice, as indicated by a flag bit, count, or other data in example module 1110, the linear shift occurs.

For embodiments where each pixel can influence more than two bins, for example N bins, example module 1110 will hold N weights, and there can be N multiply-accumulators and N registers. Such modifications to the device can be made by one of ordinary skill.

Control unit 1160 is responsible for controlling and coordinating the various elements of the apparatus of FIG. 11. It supplies addresses and read signals to table memory 1100, controls address generator 1125, sends read signals to image memory 1120, commands first multiply-accumulator 1130 and second multiply-accumulator 1132 to act, commands register 0 1142 and register 1 1140 to shift and write to 1D signal 1150, and provides any other necessary command and control functions. The connections between control unit 1160 and these other elements of FIG. 11 have been omitted from the figure for the sake of clarity of the figure. Control unit 1160 may or may not include computer software.

Herein the term multiply-accumulator refers to any digital electronic device or portion thereof that is capable of multiplying pixels by weights and adding the products to some form of storage. A multiply-accumulator can comprise an element dedicated to that purpose, such as first multiply-accumulator 1130 or second multiply-accumulator 1132, or it can comprise a portion of a more general-purpose device such as an arithmetic unit inside a microprocessor, as would be the case for inner loop 1030.

Figure 12:
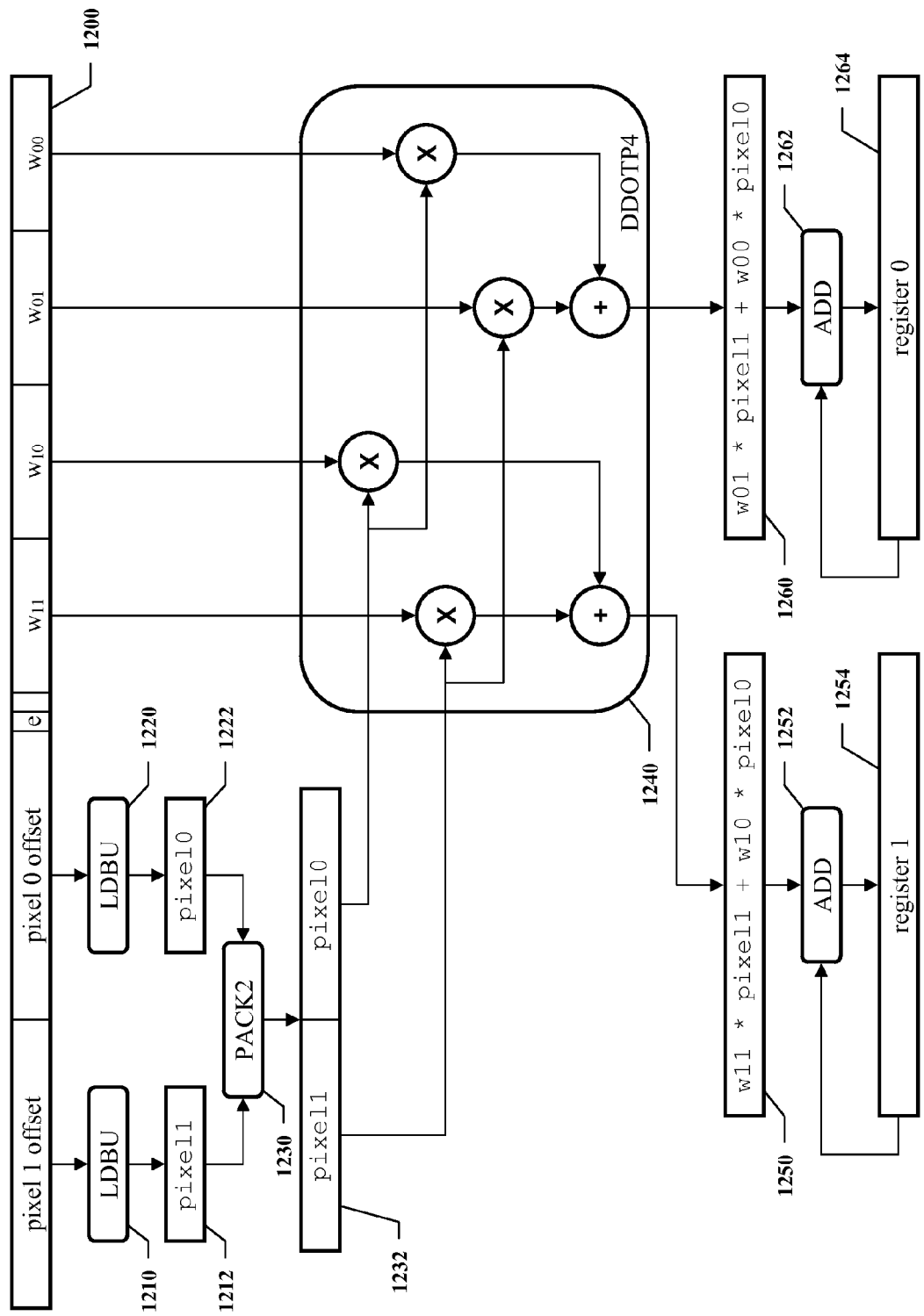
FIG. 12 illustrates an embodiment that makes use of a digital signal processor (DSP) that provides a dot product instruction.

FIG. 12 illustrates an embodiment that makes use of a digital signal processor (DSP) that provides a dot product instruction. A DSP is a microprocessor with various architectural features designed to enhance digital signal processing. In the illustrative embodiment of FIG. 12, a DSP capable of executing the Texas Instruments C64x+ instruction set is used, for example the TMS320DM6435 manufactured and sold by Texas Instruments Inc. of Dallas, Tex. This instruction set is described in commonly available documentation from Texas Instruments, for example "Literature Number SPRU732H". In FIG. 12, rectangles containing lower-case text generally represent storage locations that hold data (registers or memory), and rounded rectangles containing upper-case text represent instructions of the C64x+ instruction set.

In the illustrated embodiment, modules are comprised of slices, each pixel weight template is generated from two slices, and each pixel influences two projection bins, all as described above. Unlike previous examples, however, in the embodiment of FIG. 12 two pixels are processed in parallel using, in part, the single-instruction multiple-data (SIMD) capabilities of the C64x+ instruction set. Thus control word 1200 is similar to control word 1000, except that control word 1200 contains two pixel offsets and four weights, and is 64 bits wide. Control word 1200 also includes one end-of-slice flag labeled "e", which implies that all slices in this embodiment will fetch and process an even number of pixels.

For each control word 1200, first LDBU (load byte unsigned) instruction 1220 fetches first pixel 1222, and second LDBU instruction 1210 fetches second pixel 1212. The pixels are fetched from memory using the two offsets contained in control word 1200. The memory may be a portion of DRAM or cache, or it may be a portion of on-chip SRAM. PACK2 instruction 1230 combines first pixel 1222 and second pixel 1212 into a single 32-bit register 1232. DDOTP4 (double dot product) instruction 1240 performs the four multiplies and two adds as shown, which is a significant amount of computation for only one instruction. The two resulting dot products are placed in general register 1260 and general register 1250. First ADD instruction 1262 and second ADD instruction 1252 add the dot products to a set of two registers comprising first register 1264 and second register 1254, which can be linearly shifted to produce a 1D signal using instructions not shown.

DDOTP4 instruction 1240, first ADD instruction 1262, and second ADD instruction 1252 combine to provide the equivalent of four multiply-accumulators. Whether or not a particular DSP implementing the C64x+ instruction set, and under control of a program according to FIG. 12, actually uses four separate multipliers and four separate adders is immaterial.

Other commonly available programmable device such as microprocessors and DSPs provide dot product instructions, which may perform one, two, or even more dot products. For example, microprocessors from Intel Corp. and Advanced Micro Devices that implement the so-called MMX instruction set include a PMADDWD instruction, which performs a double dot product, and which can be used in an embodiment similar to FIG. 12. Floating point dot product instructions can also be used, for example those in the so-called SSE4 instruction set also provided by Intel and Advanced Micro Devices.

Creating templates for a set of allowable orientations, for example using the illustrative method of FIG. 7, can be computationally complex and expensive, but can be done off-line with the results stored in a memory, such as table memory 1100 of FIG. 11. For run-time operation, generating pixel weight templates from slices as described above can lead to a computationally simple and fast apparatus, as can be seen in the illustrative embodiments of FIGS. 10, 11, and 12. Computation may not be the only factor affecting speed of operation, however. One may also consider the time needed to fetch pixels from a digital image, which in some embodiments can be far greater than the time needed to process the pixels.

When using slices, pixels are fetched in an order generally determined by the orientation of a projection line and the geometry of the pixel grid, which order may not be favorable for certain kinds of memory, particularly dynamic random access memory (DRAM). If the digital image is held in static random access memory (SRAM), any order of access is as fast as any other, and so the pixel order generated by the slices does not substantially affect speed of operation. It is often the case, however, that available SRAM is too small to hold an entire image, which therefore must be placed in a generally much larger DRAM.

DRAM has the property that access to sequential memory locations is generally much faster than non-sequential access. In embodiments where the digital image is held in DRAM, therefore, it can be preferable to fetch the pixels in sequential order and process them in a different order as determined by the slices. This can be accomplished by transferring (copying) a suitable portion of the digital image held in DRAM to an SRAM. The transferring can be done in an order that is reasonably sequential, and once in SRAM the processing order imposed by slices will not degrade performance. Note that here sequential means consecutive x coordinates in an image, although of course the choice of which direction is x and which is y is an arbitrary convention.

In some embodiments, further improvements in speed can be achieved by overlapping the transferring of pixels to be used for extracting a first 1D signal with processing pixels previously fetched to extract a second 1D signal.

In some embodiments, such as the illustrative embodiments of FIGS. 10 and 12, a pixel offset is used that is an address offset combining the x and y components of the pixel offset using a known row pitch. In such embodiments, and where the address offsets are generated off-line and stored in a memory, the row pitch of the digital image may not be known in advance. Thus it can be desirable to change the row pitch, during the act of transferring the pixels, from that of the digital image to a value known in advance.

Thus it is clear that transferring pixels from a suitable portion of a digital image to a working memory can provide certain advantages, including sequential access, overlap of fetching and processing of pixels, and ability to use address offsets with a row pitch not known in advance. In any particular embodiment, some or all of these advantages can be desirable. For some of these advantages the digital image is preferably held in DRAM, and the working memory is preferably SRAM, but other arrangements can be used in other embodiments.

One way to transfer pixels so as to achieve some or all of the above advantages is to use a direct memory access controller (DMA), a digital electronic component that is often provided in programmable device such as microprocessors and DSPs.

For example, the Enhanced Direct Memory Access Controller provided by Texas Instruments, and described in commonly available documentation such as "Literature Number SPRU987A", can be used.

One important characteristic of a DMA transfer is its dimensionality. A one-dimensional transfer simply copies a sequence of pixels (for example bytes) from a source to a destination. The parameters for a 1D transfer would be a source and destination address and a count.

A two-dimensional transfer copies a portion of a 2D source array to a portion of 2D destination array. The two dimensions can be referred to as A and B. The portion can be specified as B-count rows of A-count pixels per row, and each array can be specified by an address and a B-pitch (the address difference between rows, for example). Note that the B-pitch of the source and destination arrays can differ.

A three-dimensional transfer copies a portion of a 3D source array to a portion of a 3D destination array. The three dimensions can be referred to as A, B, and C. The portion can be specified as C-count frames of B-count rows per frame of A-count pixels per row, and each array can be specified by an address, a B-pitch (the address difference between rows, for example), and a C-pitch (the address difference between frames, for example). Note that the B-pitch and C-pitch of the source and destination arrays can differ.

In general, an N-dimensional transfer has N counts, N−1 source pitches, and N−1 destination pitches. More explanation and examples of 2D and 3D transfers can be found in the above-referenced document SPRU987A. For some devices that provide 2D transfers but not 3D, a 3D transfer can be arranged by suitable chaining, linking, or otherwise programming of a sequence of 2D transfers.

Since the shape of a DMA transfer is determined by a small number of parameters (counts and pitches), for most orientations of a projection line it is usually not possible to transfer only those pixels that will be needed by the repeating sequence of pixel weight templates. Therefore unneeded pixels will be transferred, which wastes both time and space, and so it is desirable to minimize these unneeded transfers.

In some prior art image processing systems, DMA is used to transfer a rectangular portion of a digital image to faster memory for processing. The rectangular portion can be, for example, the minimum enclosing rectangle of the pixels to be processed. Here a 2D transfer is used, with source B-pitch equal to the row pitch of the source image. The destination B-pitch can be set to the A-count, resulting in a destination array that wastes no space between rows.

This prior art scheme can have a variety of drawbacks. For example, the minimum enclosing rectangle of pixels needed for a majority of orientations of a projection line generally contains too many unneeded pixels. The extra time to transfer them can negate the speed advantage of doing a DMA transfer. The extra space needed to hold them can be too large for available SRAM. The row pitch of the destination depends on the length of the projection line, which may not be known in advance.

Figure 13:
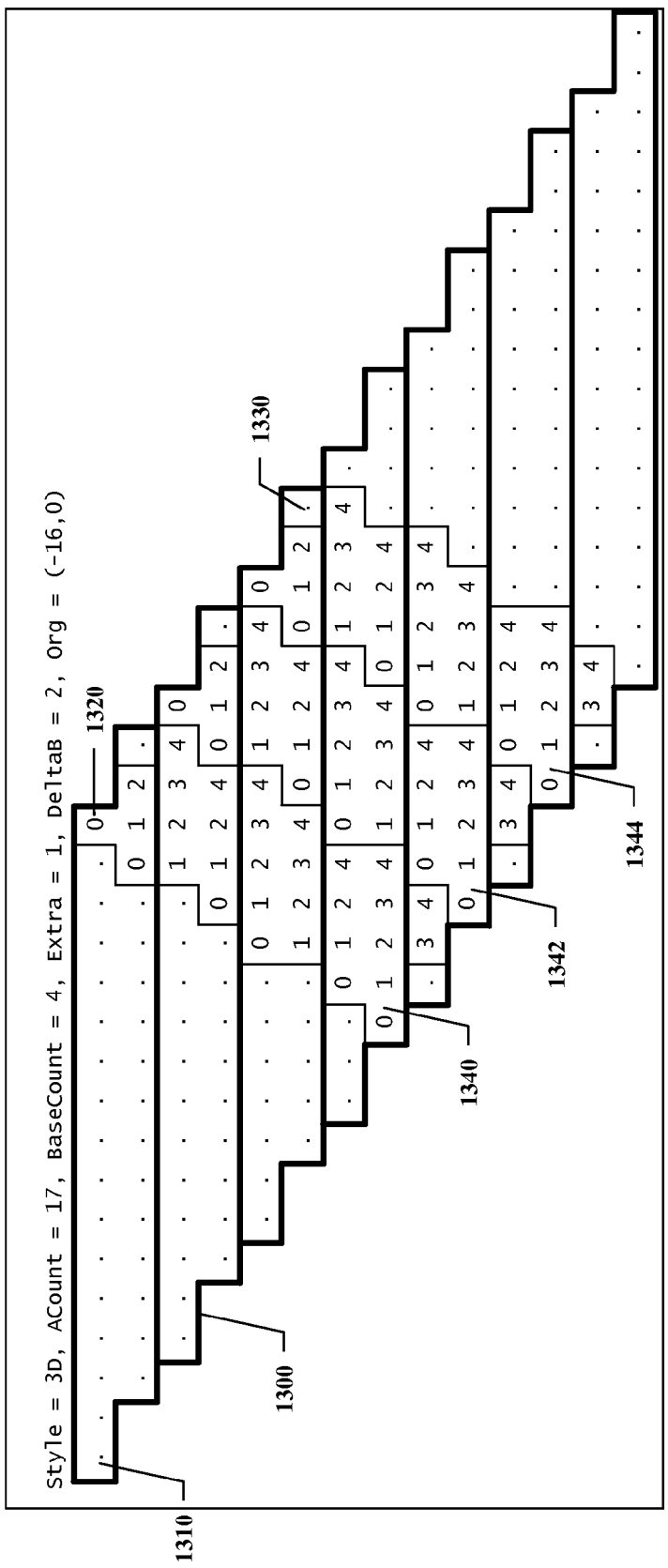
FIG. 13 illustrates an embodiment of the present invention that minimizes unneeded pixels using 2D and 3D transfers, and that allows address offsets for pixels without any prior knowledge of the source image row pitch or the length of the projection line.

FIG. 13 illustrates an embodiment of the present invention that minimizes unneeded pixels using 2D and 3D transfers, and that allows address offsets for pixels without any prior knowledge of the source image row pitch or the length of the projection line. This is accomplished in part by a two-step process. First, for a given orientation of a projection line a transfer template is selected that specifies a transfer pattern that is favorable for that orientation, for example a transfer pattern that minimizes unneeded pixels. The transfer template is part of the module associated with the orientation, and can be computed off-line for a set of allowable orientations, or a majority of the set, and stored in a memory. Alternatively, a transfer template can be computed after information describing a particular projection line is received. The illustrative embodiment of FIG. 13 uses transfer template 920.

Second, once information describing a particular projection line is received (e.g. at run-time), the transfer template associated with the orientation of the projection line is used to generate DMA transfer parameters customized for that particular projection line. The generation of the transfer parameters from the transfer template generally involves using information about the address in memory of a starting point of the projection line, and the length of the projection line.

In the example of FIG. 13, a projection line (not shown) has an orientation of slope 2 pixels down per 3 pixels to the right. A module with 5 pixel weight templates is used, generated from 5 slices. Here N=2, D=3, and P=5. The 5 slices are illustrated for first repetition 1340, second repetition 1342, and third repetition 1344. As in the example of FIG. 5 a whole number of repetitions are shown, but as described above it is not necessary to restrict the processing to a whole number. First repetition anchor pixel 1320 is also shown.

In FIG. 13, unneeded pixels that will be transferred are illustrated with a dot, including example unneeded pixel 1330. While it may seem that there are quite a few unneeded pixels in the figure, as the projection line gets longer very few unneeded pixels are added, in this example only 2 per repetition.

For the orientation in the example of FIG. 13, a 3D transfer is used. The A-count is part of transfer template 920, 17 in this example. The B-count is N, here 2, and is generally available elsewhere in a module and so need not be repeated in the transfer template. The C-count is computed as follows:

$$C\text{-count} = BaseCount + \left\lfloor \frac{NumSlices + ExtraSliceIndex}{P} \right\rfloor \quad (5)$$

Here BaseCount (here 4) and ExtraSliceIndex (here 1) are in transfer template 920, P (here 5) is generally available elsewhere in a module and so need not be repeated in the transfer template, and NumSlices (here 15) is the total number of slices to be processed for the projection line, which need not be a whole number of repetitions (i.e. multiple of P). Using the values in the example of FIG. 13, we get C-count=4+⌊(15+1)/5⌋=4+⌊3.2⌋=7. As can be seen in the figure, there are 7 frames of 2 rows per frame of 17 pixels per row, including example frame 1300.

In the example of FIG. 13, the source B-pitch is equal to the row pitch of the source image plus B offset (here 2) in transfer template 920. Note that the source B-pitch is not in general equal to the source row pitch. The source C-pitch is N times the source row pitch, plus D, which allows the 3D transfer to follow the projection line.

The destination B-pitch is equal to the A-count, and the destination C-pitch is equal to N times the A-count, which has two desirable properties. First, the pixels in the destination memory waste little storage. Storage for the unneeded pixels is required, of course, but little or no additional storage is wasted. Second, the destination B-pitch and C-pitch are computed entirely from information known in advance, so that address offsets for pixels can be used without any prior knowledge of the source image row pitch or the length of the projection line.

The source starting address is computed from the coordinates of first repetition anchor pixel 1320, which can be derived from information describing the projection line, and a DMA offset vector in transfer template 920, here (−16, 0). The destination starting address is any suitable location in the working memory where the pixels can be placed.

For modules where N=1, B-count will be 1. For these orientations a 2D transfer will suffice. What would have been the C dimension becomes the B dimension, and the C dimension is not needed.

As the orientation of the projection line approaches the x direction, the A-count increases and the number of unneeded pixels increases. At sufficiently shallow angles, i.e. sufficiently close to the x direction, it may not be desirable to use the style of 2D or 3D transfer described above. Note that these shallow orientations are generally not the same as the parallel zone orientations, and they don't include orientations near the y direction. For these shallow orientations a block-style of DMA transfer can be used. Block-style transfers are 3D, where each source frame is the minimum enclosing rectangle of the pixels needed for one repetition of the module.

FIGS. 18, 19, and 20 illustrate transfer templates for a particular set of 171 allowable orientations, including the orientation of FIG. 13, which appears in FIG. 19 in the row corresponding to 33.69 degrees. The transfer templates appear in DMA style column 1830, "A" count column 1831, base count column 1832, extra slice index column 1833, "B" offset column 1834, x origin column 1835, and y origin column 1835.

FIG. 14 illustrates an embodiment of an apparatus that can use transfer templates as described above in relation to FIG. 13. Microprocessor 1400, which can be a DSP such as the TMS320DM6435 manufactured and sold by Texas Instruments, is connected to DRAM 1410 via memory controller 1420. Microprocessor 1400 can access data in DRAM 1410 under program control via instruction and data cache 1440, which is filled as needed from DRAM 1410 by memory controller 1420.

Microprocessor 1400 can also command DMA controller 1430 to transfer data from DRAM 1410 to SRAM 1450, which does so using memory controller 1420. Microprocessor 1400 can access SRAM 1450 under program control to perform computations using the data transferred there from DRAM 1410. Microprocessor 1400 commands DMA controller 1430 in part using transfer parameters 1432.

A portion of DRAM 1410 is used for transfer table memory 1470, which holds transfer templates for a set of allowable orientations, or a portion of such a set. Transfer table memory 1470 can be a portion of a memory that holds module data as in FIG. 9. Another portion of DRAM 1410 is used for image memory 1460, which holds a digital image. A portion of SRAM 1450 is used for working memory 1452, which will receive a portion of the digital image from the image memory.

Microprocessor 1400 selects a transfer template from transfer table memory 1470 in response to the orientation of a projection line. Using the transfer template and information about the projection line, microprocessor 1400 computes a customized set of transfer parameters, transmits them to transfer parameters 1432 in DMA controller 1430, and commands DMA controller 1430 to transfer data from image memory 1440 to working memory 1452. Microprocessor 1400 computes a 1D signal along the projection line using at least a portion (for example ignoring unneeded pixels) of the data transferred to working memory 1452.

Figure 15:
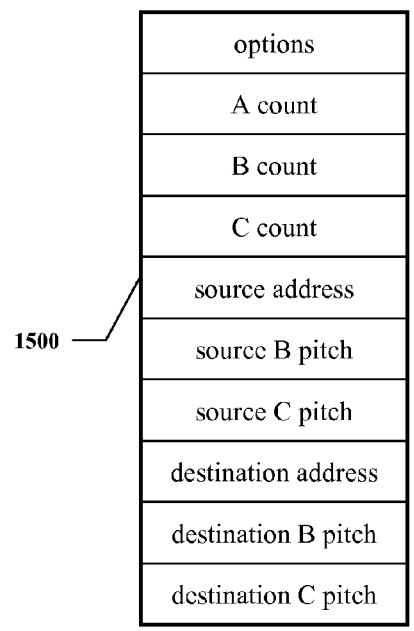
FIG. 15 shows details of an exemplary set of transfer parameters.

FIG. 15 shows details of an exemplary set of transfer parameters 1500 that can be used in conjunction with the method of FIG. 13, and for transfer parameters 1432 of FIG. 14. The "options" field allows selection of 2D or 3D transfers, among other functions. All other fields of transfer parameters 1500 have been explained above in conjunction with FIG. 13.

Step 700 of FIG. 7 selects a bin spacing for given orientation of a projection line, for example by selecting P for a given slope N/D according to equation 1. Additional information on selecting bin spacing is now provided.

FIG. 16 shows a plot 1600 of the density figure of merit defined above in equation 4, as a function of bin spacing B in pixels for an orientation of slope 3/5. For plot 1600, $\sigma_u=0.35B$, $\sigma_v=3.0$, and $\sigma_{sys}=0.28$. Density is in units of module weight per square pixel, and higher values of module weight generally imply more noise reduction. Weight generally decreases as bin spacing gets smaller, but as can be seen along density curve 1610 density is roughly constant over a wide range of bin spacing, except for a few pronounced spikes, so that density can be a useful figure of merit that includes the benefits of both noise reduction and decreased blur.

It is generally desirable to select a bin spacing corresponding to one of the spikes, for example first spike 1620, second spike 1630, third spike 1640, or fourth spike 1650. Other orientations generally exhibit similar spikes, although generally at somewhat different bin spacings and can be more or less pronounced. It may also be considered desirable to select bin spacing so that it varies reasonably smoothly as a function of orientation, so that making large jumps in bin spacing for small changes in orientation is generally avoided. Thus it is useful to be able to predict where these spikes are likely to appear.

Spikes can generally appear for values of N, D, and P that satisfy $$a\min(|N|,|D|)+b\max(|N|,|D|)=bP \qquad (6)$$

where a and b are small integers. In plot 1600, where N/D=3/5, the spikes appear as follows:

| spike | a | b | N | D | P | B |
|---|---|---|---|---|---|---|
| first spike 1620 | 1 | 1 | 3 | 5 | 8 | 0.729 |
| second spike 1630 | 2 | 3 | 3 | 5 | 7 | 0.833 |
| third spike 1640 | 1 | 2 | 6 | 10 | 13 | 0.897 |
| fourth spike 1650 | 1 | 3 | 3 | 5 | 6 | 0.972 |

Generally the spikes are most pronounced for small values of a and b, for example a=1 and b=1 or 2. Note here an example of N and D not being relatively prime.

A reasonable strategy, particularly for the normal zone of orientations, is to use a=1, b=1 for embodiments where high resolution is desired, and a=1, b=2 for embodiments where somewhat less resolution is desired. Other selections may also be reasonable, including following the guidance provided by equation 6. For the degenerate zone, and particularly for the parallel zone, and for even lower resolution where a bin spacing greater than 1 pixel may be preferred, other selections can be made as described elsewhere herein.

FIG. 17 provides declarations in the C programming language for specifying module 900 in an illustrative embodiment. The declarations of FIG. 17 also define the data of FIGS. 18, 19, and 20, which illustrate modules for a set of allowable orientations in the form of an initialized static array in the C programming language.

Enumeration declaration 1700 provides symbolic names for the various DMA styles that can be used in an illustrative embodiment. BlockStyle, TwoDStyle, and ThreeDStyle have been described above in relation to FIG. 13. V2DStyle and V3DStyle are used in the same way as TwoDStyle and ThreeDStyle for transferring data. They are used for orientations closer to the y direction than the x direction (i.e. above 45 degrees), to allow those orientations to be created from orientations below 45 degrees by exchanging x and y as appropriate.

Structure declaration 1710 specifies the layout and data types for an illustrative module. The term "S16.8" refers to a 16-bit signed fixed-point value with 8 bits to the right of the binary point. The controlCodes element is a pointer to data defining the pixel positions and weights for the slices of the module, which can be in any suitable form, for example an array of control word 1000 or control word 1200. In FIGS. 18, 19, and 20, this pointer is shown in control code pointer column 1840. All other elements of structure declaration 1710, and all other columns of FIGS. 18, 19, and 20, have been described elsewhere herein.

Since the modules of FIGS. 18, 19, and 20 are sorted in order of increasing slope, a module closest to the slope of any given projection line, for example requested projection line 250 of FIG. 2, can be selected quickly using a binary search. While only the angles between 0 and 90 degrees are shown, the orientations from 90 to 180 degrees can be created from the ones shown by negating they coordinate when calculating address offsets, for generating DMA transfer parameters from transfer templates, and at other appropriate places, as will be apparent to one of ordinary skill.

The set of allowable orientations in FIGS. 18, 19, and 20 has been selected so that the angle difference between successive orientations does not exceed 0.7 degrees, and so that modules with small values of D are preferred. Any suitable method for selecting the set of allowable orientations can be used, for example selecting a set that has a substantially constant angle difference between successive orientations. In embodiments where modules are not stored in a table but rather computed as needed after information describing a projection line is received, the set of allowable orientations can be substantially different from the one shown here.

The above-described techniques can be implemented in digital electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a CPLD (complex programmable logic device), a PSoC (Programmable System-on-Chip), ASIP (application-specific instruction-set processor), or an ASIC (application-specific integrated circuit). Subroutines can refer to portions of the computer program and/or the processor/special circuitry that implement one or more functions.

Processors suitable for the execution of a computer program include, by way of example, both general and special purpose microprocessors, digital signal processors, and any one or more processors of any kind of digital computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. A computer can be operatively coupled to external equipment, for example factory automation or logistics equipment, or to a communications network, for example a factory automation or logistics network, in order to receive instructions and/or data from the equipment or network and/or to transfer instructions and/or data to the equipment or network. Computer-readable storage devices suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

The invention claimed is:

1. A computerized method for extracting from a two-dimensional digital image a one-dimensional digital signal along a projection line, comprising:
   receiving the two-dimensional digital image, which comprises a plurality of pixels arranged on a pixel grid;
   receiving information describing the projection line, from which can be obtained an orientation of the projection line, wherein the orientation is one of a set of allowable orientations, the set of allowable orientations including a plurality of orientations that are not parallel to the pixel grid and are not diagonal to the pixel grid;
   selecting, responsive to the orientation, a repeating sequence of pixel weight templates and a sequence of relative positions, wherein the sequence of pixel weight templates comprises at least two distinct pixel weight templates; and
   computing a sequence of weighted sums of pixels of the digital image using the sequence of pixel weight templates placed at the sequence of relative positions.

2. The method of claim 1, wherein selecting the repeating sequence of pixel weight templates and the sequence of relative positions comprises making the centers of mass of the sequence of pixel weight templates, when placed according to the sequence of relative positions, substantially equally spaced along a straight line.

3. The method of claim 2, wherein the straight line is substantially parallel to the projection line.

4. The method of claim 1, wherein for a majority of the set of allowable orientations, pixels of the digital image contribute to at most two weighted sums.

5. The method of claim 1, wherein for a majority of the set of allowable orientations, pixels of the digital image that contribute to the weighted sums contribute to two weighted sums.

6. The method of claim 1, wherein the repeating sequence of pixel weight templates is pre-computed and stored in a digital memory.

7. The method of claim 1, wherein selecting the repeating sequence of pixel weight templates and the sequence of relative positions comprises making the centers of mass of the sequence of pixel weight templates, when placed according to the sequence of relative positions, have a spacing along the projection line that is less than one pixel.

8. The method of claim 1, wherein selecting the repeating sequence of pixel weight templates and the corresponding sequence of relative positions comprises making the centers of mass of the sequence of pixel weight templates, when placed according to the sequence of relative positions, have a spacing along the projection line that is responsive to the orientation of the projection line.

9. The method of claim 1, wherein the repeating sequence of pixel weight templates repeats with a period that is responsive to the orientation of the projection line.

10. The method of claim 9, wherein the orientation of the projection line has a slope that is the ratio of an integer N to an integer D, and wherein the period is equal to the sum of N and D.

11. The method of claim 1, wherein selecting the repeating sequence of pixel weight templates comprises making standard deviations along the projection line of the pixel weight templates be proportional to the spacing of the centers of mass of the pixel weight templates.

12. The method of claim 1, wherein the set of allowable orientations comprises a normal zone and a degenerate zone, and wherein for the normal zone pixels of the digital image that contribute to the weighted sums contribute to two weighted sums, and wherein for the degenerate zone, pixels of the digital image that contribute to the weighted sums contribute to one weighted sum.

13. The method of claim 1, wherein the set of allowable orientations comprises a normal zone and a degenerate zone, and wherein selecting the repeating sequence of pixel weight templates and the sequence of relative positions comprises making the centers of mass of the sequence of pixel weight templates, when placed according to the sequence of relative positions, have a spacing along the projection line that is obtained from a first formula for the normal zone and from a second formula for the degenerate zone.

14. The method of claim 1, wherein set of allowable orientations comprises a normal zone, a parallel zone, and a diagonal zone, and wherein selecting the repeating sequence of pixel weight templates comprises a different procedure for the normal zone, the parallel zone, and the diagonal zone.

* * * * *